(12) United States Patent
Eyvazzadeh et al.

(10) Patent No.: US 10,928,548 B2
(45) Date of Patent: Feb. 23, 2021

(54) ROCK TYPE BASED FREE WATER LEVEL INVERSION

(71) Applicant: Saudi Arabian Oil Company, Dhahran (SA)

(72) Inventors: Ramsin Y. Eyvazzadeh, Dhahran (SA); Denis P. Schmitt, Dhahran (SA); David Kersey, Dhahran (SA); George Saghiyyah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 825 days.

(21) Appl. No.: 15/458,456

(22) Filed: Mar. 14, 2017

(65) Prior Publication Data
US 2018/0267204 A1    Sep. 20, 2018

(51) Int. Cl.
| | |
|---|---|
| *G01V 99/00* | (2009.01) |
| *G01V 11/00* | (2006.01) |
| *G01V 3/38* | (2006.01) |
| *E21B 47/107* | (2012.01) |
| *G01V 3/32* | (2006.01) |

(52) U.S. Cl.
CPC .......... *G01V 99/005* (2013.01); *E21B 47/107* (2020.05); *G01V 3/38* (2013.01); *G01V 11/00* (2013.01); *G01V 3/32* (2013.01)

(58) Field of Classification Search
CPC ........ G01V 99/005; G01V 11/00; E21B 49/00
See application file for complete search history.

(56) References Cited

U.S. PATENT DOCUMENTS

| | | | | |
|---|---|---|---|---|
| 4,903,207 | A | * | 2/1990 | Alger .................... E21B 49/005 324/376 |
| 5,431,562 | A |   | 10/1995 | Tabanou et al. |
| 5,621,169 | A |   | 4/1997 | Harris et al. |
| 6,792,354 | B1 | * | 9/2004 | O'Meara, Jr. ............ G01V 1/50 702/13 |
| 6,833,699 | B2 |   | 12/2004 | Galford et al. |

(Continued)

FOREIGN PATENT DOCUMENTS

WO    WO2016164507 A1    10/2016

OTHER PUBLICATIONS

"Water Saturation distribution in a reservoir," 2016, AAPG Wiki, https://wiki.aapg.org/Water_saturation_distribution_in_a_reservoir, pp. 1-2. (Year: 2016).*

(Continued)

*Primary Examiner* — John E Breene
*Assistant Examiner* — Christine Y Liao
(74) *Attorney, Agent, or Firm* — Bracewell LLP; Constance G. Rhebergen; Brian H. Tompkins

(57) ABSTRACT

A determination of the free water level for a hydrocarbon-bearing reservoir is provided that accounts for the different classified rock types (that is, facies) in the reservoir. The free water level for each unique combination of facies is determined using a least squares minimization between a reference bulk volume of oil ($B_{vo}^{log}$) determined from well logs a bulk volume of oil ($B_{vo}^{calc}$) calculated from a saturation height function for each of the facies present in the reservoir. Systems and process for determining the free water level are provided.

22 Claims, 18 Drawing Sheets

(56) References Cited

U.S. PATENT DOCUMENTS

| | | |
|---|---|---|
| 7,526,385 B2 | 4/2009 | Sayers |
| 8,907,951 B2 | 12/2014 | Calvo et al. |
| 9,201,164 B2 | 12/2015 | Thorne |
| 2006/0020390 A1 | 1/2006 | Miller |
| 2007/0276604 A1 | 11/2007 | Williams et al. |
| 2013/0103319 A1 | 4/2013 | Buiting et al. |
| 2014/0257702 A1 | 9/2014 | Al-Ibrahim et al. |
| 2015/0276978 A1 | 10/2015 | Dupuy et al. |
| 2016/0124115 A1 | 5/2016 | Theologou et al. |
| 2016/0187532 A1 | 6/2016 | Hurley |
| 2018/0163533 A1* | 6/2018 | Wlodarczyk ........... E21B 49/00 |

OTHER PUBLICATIONS

Ali-Nandalal et al., "Characterising Reservoir Performance for the Mahogany 20 Gas Sand Based on Petrophysical and Rock Typing Methods", SPE 81048, SPE Latin American and Caribbean Petroleum Engineering Conference, Apr. 27-30, 2003, pp. 1-11.

Dake, "The Practice of Reservoir Engineering", Developments in Petroleum Science 36, 2001, Elsevier, pp. 1-565.

Dennis et al., "An Adaptive Nonlinear Least-Squares Algorithm", ACMTransactions on Mathematical Software, Sep. 1981, vol. 7, No. 7, pp. 348-368.

Ebanks et al., "Flow Units for Reservoir Characterization", Geological Methods, 1992, pp. 282-285.

Gill et al., "Algorithms for the Solution of the Nonlinear Least-Squares Problem", Society for Industrial and Applied Mathematics, SIAM Journal on Numerical Analysis, vol. 15, No. 5 (Oct. 1978), pp. 977-992.

Gunter et al., "Early Determination of Reservoir Flow Units Using an Integrated Petrophysical Method", SPE 38679, SPE Annual Technical Conference and Exhibition, Oct. 5-8, 1997, pp. 1-8.

Gunter et al., "Saturation Modeling at the Well Log Scale Using Petrophysical Rock Types and a Classic Non-Resistivity Based Method", SPWLA 40th Annual Logging Symposium, May 30-Jun. 3, 1999, pp. 1-12.

Hanson, "Linear Least Squares with Bounds and Linear Constraints", SIAM J. Sci. Stat. Comput., vol. 7, No. 3, Jul. 1986, pp. 826-834.

Hartmann et al., "Evaluation of the Morrow Sandstone in Sorrento Field, Cheyenne County Colorado", Rocky Mountain Association of Geologist, 2009, pp. 91-100.

Katz et al., "Quantitative prediction of permeability in porous rock", the American Physical Society, Physical Review B, Dec. 1, 1986, vol. 34, No. 11, pp. 8179-8181.

Kolodzie, "Analysis of Pore Throat Size and Use of the Waxman-SMITS Equation to Determine OOIP in Spindle Field Colorado", SPE 9382, 55th Annual Fall Technical Conference and Exhibition of the Society of Petroleum Engineers of AIME, Sep. 1980, pp. 1-10.

More et al., "User Guide for Minipack-1", Argonne National Laboratory, 1980, pp. 1-261.

Pittman, "Relationship of Porosity and Permeability to Various Parameters Derived from Mercury Injection-Capillary Pressure Curves for Sandstone", the American Association of Petroleum Geologists Bulletin, 1992, pp. 191-198, vol. 76, No. 2.

Xu et al., "Saturation-Height and Invasion Consistent Hydraulic Rock Typing Using Multi-Well Conventional Logs", SPWLA 53rd Annual Logging Symposium, 2012, pp. 1-16.

International Search Report and Written Opinion for International Application No. PCT/US2018/022363; International Filing Date Mar. 14, 2018; Report dated Jun. 25, 2018 (pp. 1-14).

Tiab, Djebbar and Donaldson, Erle, C.; "Petrophysics—Theory and Practice of Measuring Reservoir Rocka nd Fluid Transport Properties" Gulf Professional Publishing, 2004, pp. 1-926.

\* cited by examiner

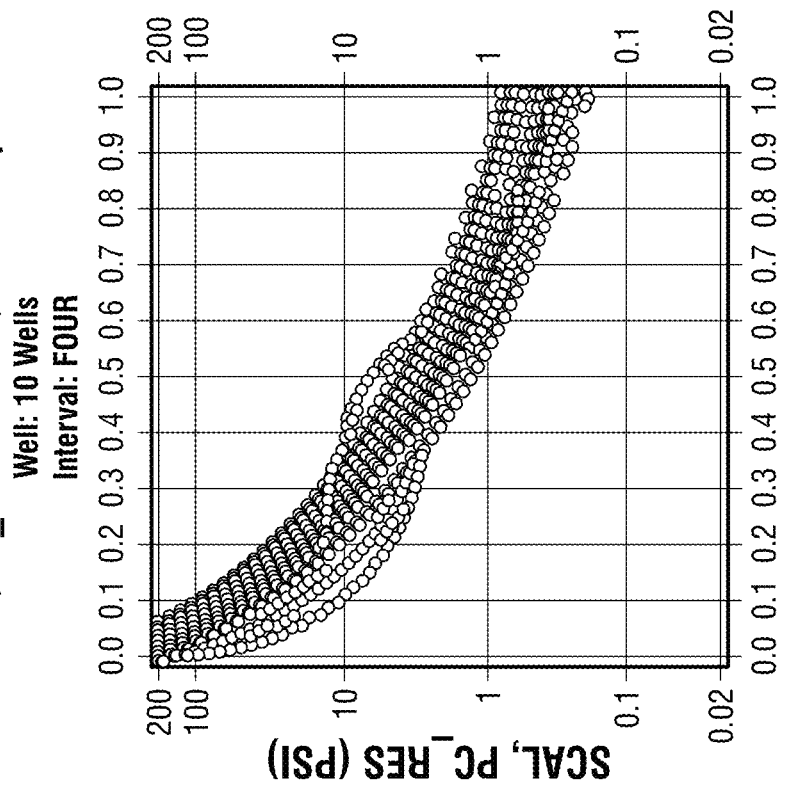
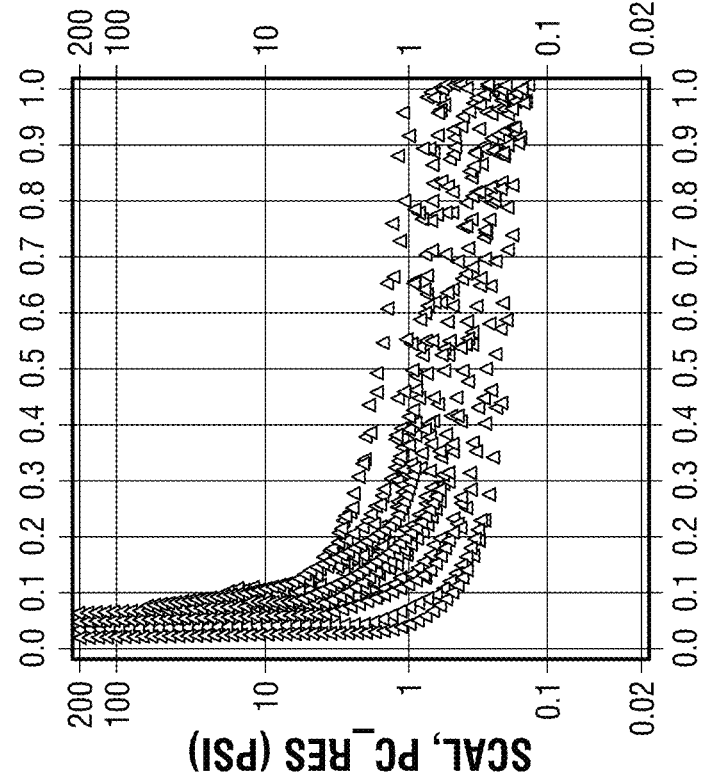

ROCK TYPE = 2

ROCK TYPE = 1

ROCK TYPE = 6,7

ROCK TYPE = 5

1300

DEFINITION  /—1302

TRI-MODAL SATURATION MODEL

THE WATER SATURATION $S_\omega^{calc}$ FOR THE TRI-MODAL MODEL IS WRITTEN ???

$$S_\omega^{calc} = \alpha_1 + (1-\alpha_1) * A_{j_2}(R_{35}, P_c) * A_j(R_{35}, P_c) * A_{j_2}(R_{35}, P_c).$$

THE GENERAL EXPRESSION FOR $A_j(R_{32}, P_c)$ ($j = 1,2,3$), WHOSE ORDER IS ARBITRARY, IS OF THE FORM:

$$A_j(R_{35}, P_c) = \begin{cases} 1-e^{\left\{\dfrac{\beta_{A_j}}{\ln\alpha_{A_j} - n\, P_c}\right\}} & \text{IF } P_c - \alpha_{A_j} > P_{lim}, j = 2,3,4 \\ 1 & \text{OTHERWISE} \end{cases}$$

WHERE $P_{lim}$ IS THE ENTRY PRESSURE, GENERALLY EQUAL TO 0.1. IT IS UNDERSTOOD THAT $\alpha_1$ AS WELL AS $\alpha_{A_j}$ AND $\beta_{A_j}$, FOR $j=2,3,4$ ALL DEPEND ON $R_{35}$.

THE $\alpha_{A_j}$ CAN BE WRITTEN AS $$\alpha_{A_j} = a_{a_{A_j}} + b_{\alpha_{A_j}} * G_{\alpha_{A_j}}(R_{35}, C_{\alpha_{A_j}}), \text{ WITH } G_{\alpha_{A_j}}(R_{35}, C_{\alpha_{A_j}}) = \begin{cases} R_{35}, & \text{WITH } C_{\alpha_{A_j}} = 0\ (g\alpha_{A_j} = 1) \\ R_{35}^{C_{\alpha_{A_j}}}, & \text{WITH } C_{\alpha_{A_j}} < 0\ (g\alpha_{A_j} = 2) \\ \log_{10} R_{35}, & \text{WITH } C_{\alpha_{A_j}} = 0\ (g\alpha_{A_j} = 3) \end{cases}$$

WHERE THE $G_{\alpha_{A_j}}$, $B_{\alpha_{A_j}}$, AND $C_{\alpha_{A_j}}$ ARE REAL NUMBERS.

WHILE THE $g_{\alpha_{A_j}}$ ARE INTEGER CONSTANTS REQUIRED TO IDENTIFY THE FUNCTIONS $G_{\alpha_{A_j}}(R_{35}, C_{\alpha_{A_j}})$.

$\alpha_1$ AND THE $\beta_{A_j}$ ARE DEFINED BY SIMILAR EQUATION REPLACING $\alpha_{A_j}$ BY $\alpha_1$, AND $\beta_{A_j}$, RESPECTIVELY FOR A FACIES $F$, WHOSE SATURATION IS BEST DESCRIBED BY THE TRI-MODEL. TABLE (1) PRESENTS THE PARAMETERS PROVIDED (SEE EQS. (1) TO (3)):

| $g\alpha_1$ | $a\alpha_1$ | $b\alpha_1$ | $c\alpha_1$ | | | | |
|---|---|---|---|---|---|---|---|
| $g\alpha_{A_j1}$ | $a\alpha_{A_j1}$ | $b\alpha_{A_j1}$ | $c\alpha_{A_j1}$ | $g\beta_{A_j1}$ | $a\beta_{A_j1}$ | $b\beta_{A_j1}$ | $c\beta_{A_j1}$ |
| $g\alpha_{A_j2}$ | $a\alpha_{A_j2}$ | $b\alpha_{A_j2}$ | $c\alpha_{A_j2}$ | $g\beta_{A_j2}$ | $a\beta_{A_j2}$ | $b\beta_{A_j2}$ | $c\beta_{A_j2}$ |
| $g\alpha_{A_j2}$ | $a\alpha_{A_j3}$ | $b\alpha_{A_j3}$ | $c\alpha_{A_j3}$ | $g\beta_{A_j3}$ | $a\beta_{A_j3}$ | $b\beta_{A_j3}$ | $c\beta_{A_j3}$ |

TABLE 1: PARAMETERS FOR FACIES $F$, WHOSE SATURATION IS BEST DESCRIBED BY THE TRI-MODAL MODEL.

PARAMETERS FOR FACIES 2

| | | | |
|---|---|---|---|
| g_α₁ [1] | a_α₁ 0.068908 | b_α₁ -0.000836 | c_α₁ 0 |
| g_α(A1) [2] | a_α(A1) 0 | b_α(A1) 70.045137 | c_α(A1) -1.012515 |
| g_α(A2) [3] | a_α(A2) 49.341114 | b_α(A2) -36.522367 | c_α(A2) 0 |
| g_α(A3) [1] | a_α(A3) 1089.801406 | b_α(A3) -27.730865 | c_α(A3) 0 |
| g_β(A1) [3] | a_β(A1) 0.295195 | b_β(A1) 0.269377 | c_β(A1) 0 |
| g_β(A2) [1] | a_β(A2) 2.300685 | b_β(A2) -0.025004 | c_β(A2) 0 |
| g_β(A3) [1] | a_β(A3) 0.361683 | b_β(A3) 0.005762 | c_β(A3) 0 |

[RETURN VIEW NO SAVE] — 1308A
[RETURN AND SAVE] — 1308B

FIG. 13

ROCK TYPE BASED FREE WATER LEVEL INVERSION

BACKGROUND

Field of the Disclosure

Embodiments of the disclosure generally relate to the production of hydrocarbons from hydrocarbon-bearing reservoirs and, more particularly, to the evaluation of fluids in such reservoirs.

Description of the Related Art

Information about fluids in a hydrocarbon-bearing reservoir are important for properly characterizing the reservoir and conducting optimal drilling and production operations to efficiently extract hydrocarbons. Increasing the accuracy of this information may increase the accuracy of subsequent determinations used to characterize a reservoir. Various devices and techniques exist for determining the fluids information, such as downhole tools and core sampling of reservoir rock. These techniques have particular limitations and costs and may not provide the most accurate fluids information. Moreover, the determination of some fluids information may be time-consuming and may result in delays in drilling and production.

SUMMARY

One property of a hydrocarbon-bearing reservoir useful for characterizing the reservoir is free water level (FWL). As will be appreciated, free water level refers to the depth at which the capillary pressure is equal to zero. The free water level may be used in exploration, reservoir management, and reserves assessment, as well as other areas.

An existing technique for determining the free water level is to use formation testing tools to determine fluid gradients from the differences in fluid densities. However, this technique is limited to fields that have no prior production and wells having intervals that contain water and hydrocarbons.

Another existing technique for determining the free water level is the integration of log and laboratory measurements on core samples of reservoir rock. The core samples may be initially analyzed in a laboratory where capillary measurements (for example, mercury injection capillary pressure) may be made as a function of fluid saturations. FIG. 1 depicts a plot 100 of a mercury injection capillary pressure (MICP) experiment performed on a core sample of reservoir rock. Such capillary measurements may be made on many different core samples that may be grouped based on the type of rock (for example, the characteristics of the rock, also referred to as "facies"). FIG. 2 depicts an example of capillary pressure measurements 200 from core samples distributed among six different rock types using MICP techniques. The capillary pressure measurements for each rock type are then converted to reservoir conditions, and water saturation height functions (referred to simply as "saturation height functions") may by determined by fitting a surface to the MICP measurements to derive a water saturation that is a function of rock type and reservoir capillary pressure. FIG. 3 depicts such fitted surfaces 300 (that is, saturation-height functions) for each of the six different rock types depicted in FIG. 2.

In such existing techniques, the equivalent rock types are then derived from measurements made from well logs. FIG. 4 depicts an example 400 of existing determinations illustrating the use of porosity and permeability to define each rock type according to existing techniques. Track 5 in FIG. 4 shows the different facies (illustrated in different colors) for each rock type. The saturation height functions are then assigned to each rock type to calculate water saturation at every depth. For example, the red line in Track 2 in FIG. 4 depicts a water saturation based on the saturation height function derived from core sample capillary pressure measurement. The black line in Track 2 depicts a water saturation calculated from well log data. When the height of the free water level is unknown, the two water saturations—the water saturation based on the core sample saturation height function and the water saturation calculated from well log data—are compared and, based on the lowest error in an error minimization routine, a free water level is estimated. The error minimization routine is typically interval-based and does not account for the different rock types that may or may not be present in the considered interval.

The existing technique discussed above is strongly dependent on rock quality and its relative height from the free water level. With intervals of relatively good rock quality, the calculation of bulk volume of oil becomes less sensitive to the changes of the free water level. This sensitivity further decreases as the height increases above the free water level. In contrast, the bulk volume of oil calculated in lower quality rock intervals is highly sensitive to the changes of the free water level, especially when approaching the free water level. As many different rock types existing in a reservoir, an approach where an inversion is based on an entire interval can produce large errors and large differences. Such errors may be greater in heterogeneous reservoirs having regions with different rock types in every well.

FIG. 5 is a bar graph 500 of the heights of free water level (HFWL) obtained by the existing error minimization techniques using seven different rock types. The bar graph 500 includes the free water level heights from rock type 1 (corresponding to the best quality rock) and rock type 7 (corresponding to the lowest quality rock). The bar graph also includes the free water level height for the combination of all rock types. As shown in FIG. 5, the free water level heights have a difference of 75 feet relative to the different rock types and show a relatively large degree of variability. These large differences in the determined free water levels can have a great impact on reservoir management and reserves estimation, especially in large fields where even small inaccuracies in the free water level could translate into large amounts of hydrocarbon volume in place (HCPV).

To further illustrate the variability of the existing techniques, FIG. 6 depicts a plot 600 of the height of free water level calculated based on a combination of all rock types in several wells using the existing error minimization technique described above. As shown in FIG. 6, the technique results in a high variability in the free water level height in a reservoir due to the variation in rock qualities and distance from the free water level. Existing approaches typically determine the average of these variable free water level values if the reservoir is not compartmentalized or has a titled free water level.

Embodiments of the disclosure include methods and systems for determining a free water level associated with a hydrocarbon-bearing reservoir that accounts for the different classified rock types (that is, facies) in the reservoir. In one embodiment, a method for determining a free water level associated with a hydrocarbon-bearing reservoir having a plurality of facies is provided. The method includes determining a reference bulk volume of oil from a well log. The reference bulk volume of oil is determined from a well log porosity and a well log water saturation and calculating a bulk volume of oil from the well log porosity and a water saturation calculated using a capillary pressure associated with each of the plurality of facies. The method further includes determining the free water level for each combination of the plurality of facies, the determining including a least squares minimization of the reference bulk volume of oil and the calculated bulk volume of oil for each combination of the plurality of facies.

In some embodiments, the method includes inserting a wireline tool into the well and generating the well log from measurements obtained from the wireline tool. In some embodiments, the method includes identifying a number of the plurality of facies according to a facies classification scheme. In some embodiments, the facies classification scheme is Winland $r_{35}$. In some embodiments, the method includes determining a combination of the plurality of facies that has a free water level having the lowest residue from the least squares minimization. In some embodiments, the method includes determining a selected one of the plurality of facies that has the largest contribution to the determined free water level for each combination of the plurality of facies. In some embodiments, the least squares minimization of the reference bulk volume of oil and the calculated bulk volume of oil for each combination of the plurality of facies is performed in a lexicographic order of the plurality of facies. In some embodiments, the capillary pressure associated with each of the plurality of facies is determined from a core sample having a respective facie of the plurality of facies. In some embodiments, the water saturation calculated using the capillary pressure associated with each of the plurality of facies is calculated using a saturation height function, the saturation height function includes at least one of a tri-modal model, a bi-modal model, an equivalent radius model (EQR), a Thomeer model, a Brooks-Corey model, a modified Johnson model, a Lambda model, a Skelt-Harrison model, and a Levrett model.

In another embodiment, a system for determining a free water level associated with a hydrocarbon-bearing reservoir having a plurality of facies. The system includes a processor and a non-transitory computer-readable memory accessible by the processor. The memory has executable code stored thereon having a set of instructions that causes the processor to perform operations that include obtaining a reference bulk volume of oil determined from a well log, the reference bulk volume of oil further determined from a well log porosity and a well log water saturation and calculating a bulk volume of oil from the well log porosity and a water saturation calculated using a capillary pressure associated with each of the plurality of facies. The operations further include determining the free water level for each combination of the plurality of facies, the determining includes a least squares minimization of the reference bulk volume of oil and the calculated bulk volume of oil for each combination of the plurality of facies. In some embodiments, the system includes wireline logging tool configured to be inserted into the well and produce the well log. In some embodiments, the operations include receiving an identification of a number of the plurality of facies according to a facies classification scheme. In some embodiments, the operations include determining a combination of the plurality of facies that has a free water level having the lowest error residue from the least squares minimization. In some embodiments, the operations include determining a selected one of the plurality of facies that has the greatest contribution to the determined free water level for each combination of the plurality of facies. In some embodiments, the least squares minimization of the reference bulk volume of oil and the calculated bulk volume of oil for each combination of the plurality of facies is performed in a lexicographic order of the plurality of facies. In some embodiments, the capillary pressure associated with each of the plurality of facies is determined from a core sample of a respective facie of the plurality of facies. In some embodiments, the water saturation calculated using the capillary pressure associated with each of the plurality of facies is calculated using a saturation height function. In some embodiments, the operations include receiving a selection of a saturation height function in a graphical user interface provided on the display. In some embodiments, the operations include outputting a bar graph on the display, the bar graph depicting the determined free water level for each combination of the plurality of facies. In some embodiments, the operations include outputting a bar graph on the display, the bar graph depicting a relative percentage of each of the plurality of facies in a well.

In another embodiments, a non-transitory computer-readable medium is provided. The non-transitory computer-readable medium has executable code stored thereon for determining a free water level associated with a hydrocarbon-bearing reservoir having a plurality of facies. The executable code includes a set of instructions that causes a processor to perform operations that include obtaining a reference bulk volume of oil determined from a well log, the reference bulk volume of oil further determined from a well log porosity and a well log water saturation and calculating a bulk volume of oil from the well log porosity and a water saturation calculated using a capillary pressure associated with each of the plurality of facies. The operations further include determining the free water level for each combination of the plurality of facies, the determining includes a least squares minimization of the reference bulk volume of oil and the calculated bulk volume of oil for each combination of the plurality of facies.

BRIEF DESCRIPTION OF THE DRAWINGS

FIGS. 11-14 depict screens of an example user interface elements of a graphical user interface for a process for determining free water level in accordance with embodiments of the disclosure.

DETAILED DESCRIPTION

Figure 1:
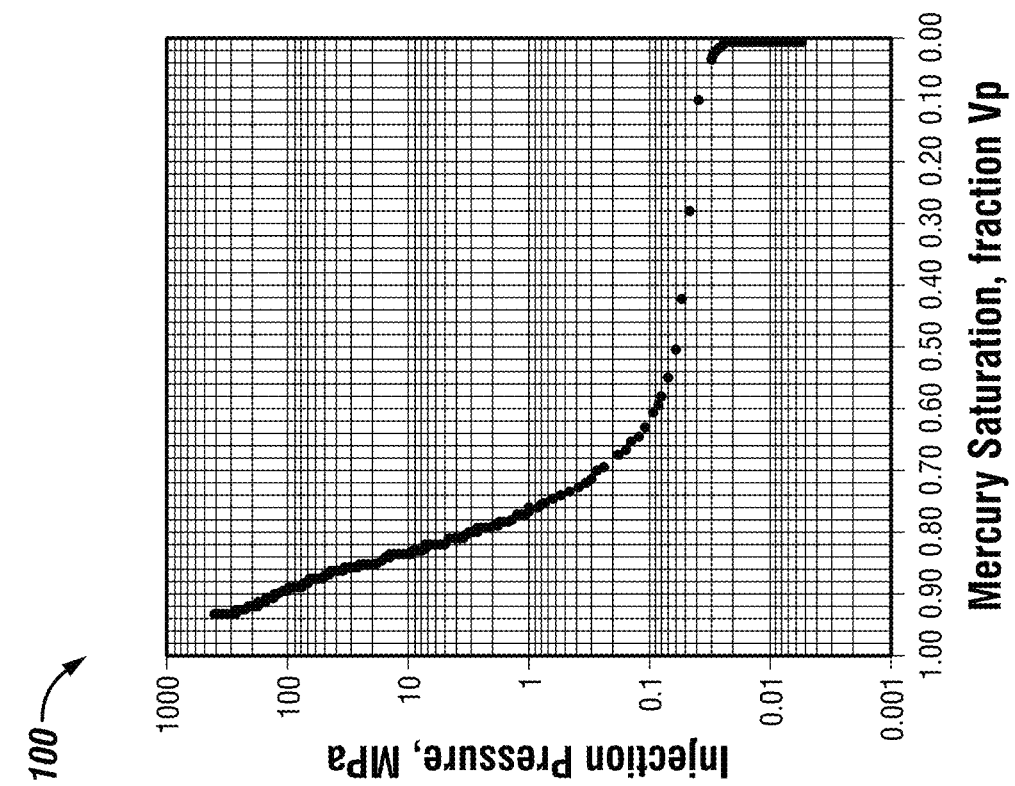
FIG. 1 is an example plot of a mercury injection capillary pressure (MICP) experiment performed on a core sample of reservoir rock.
Figure 2A:
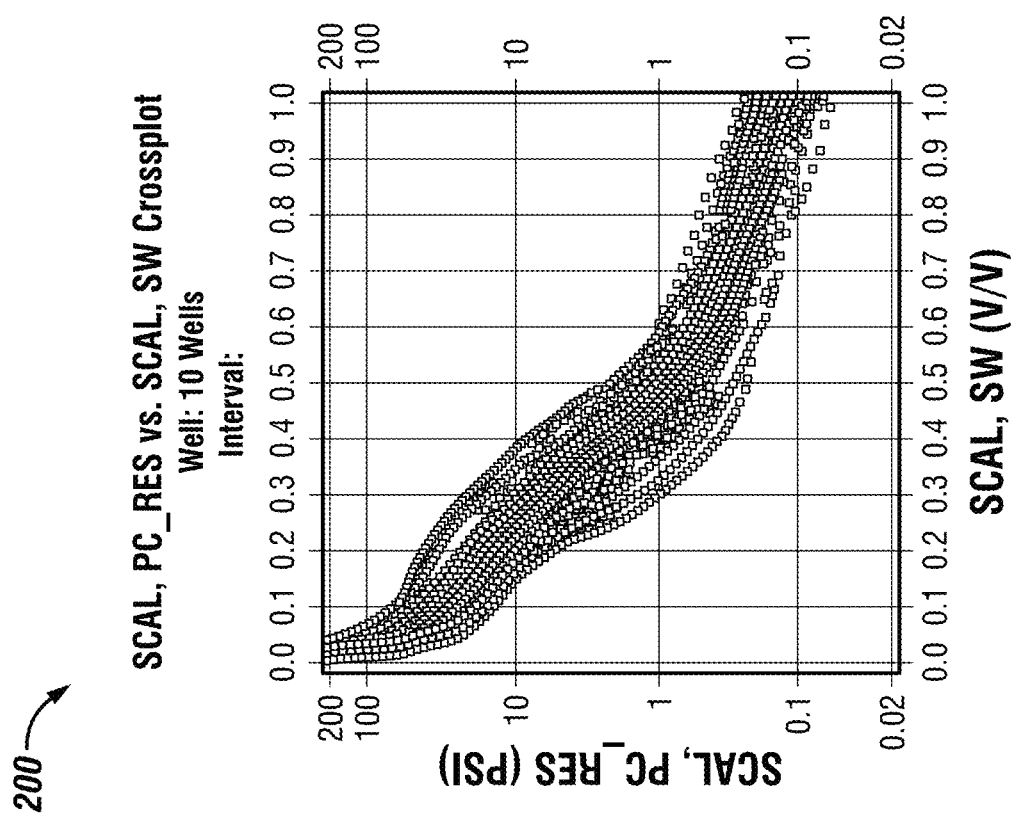
FIG. 2 depicts example plots of prior art mercury injection capillary pressure determinations performed on core samples measured and distributed among six different rock types.
Figure 2E:
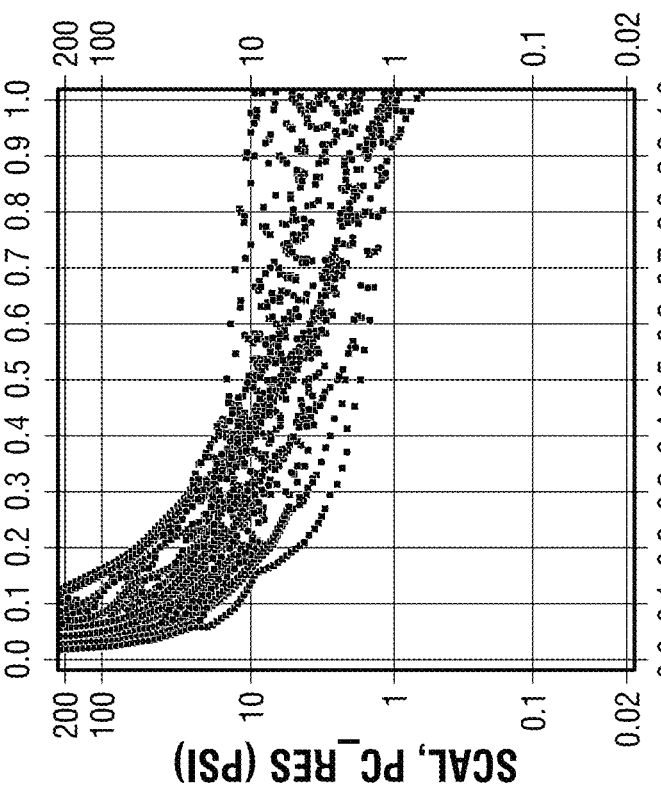
Figure 2D:
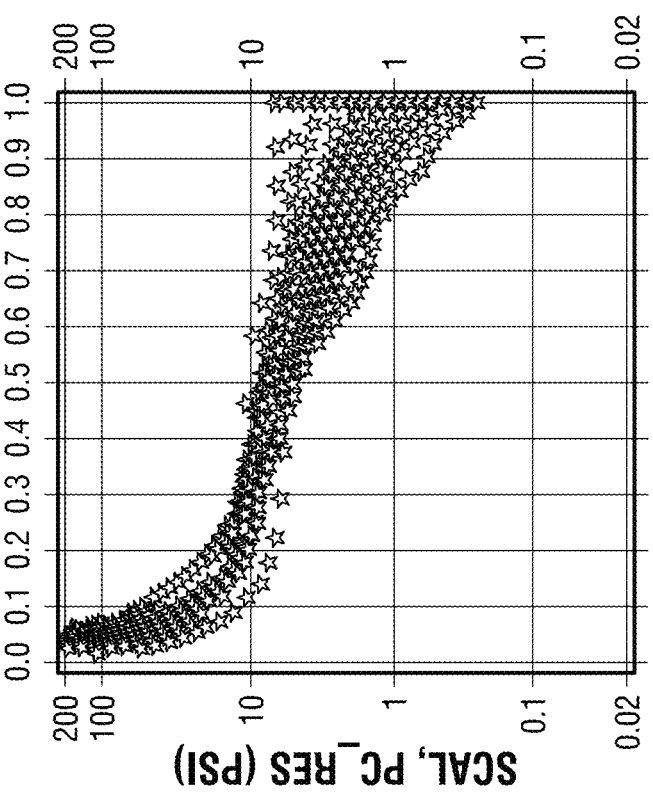
Figure 2F:
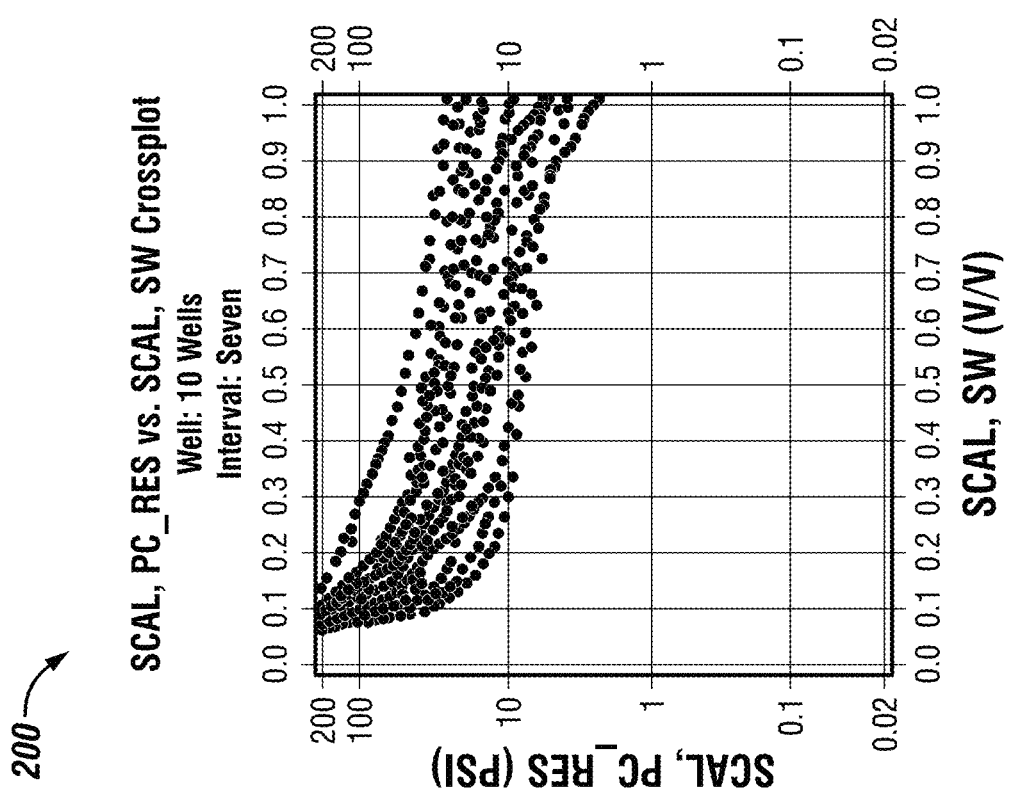
Figure 3B:
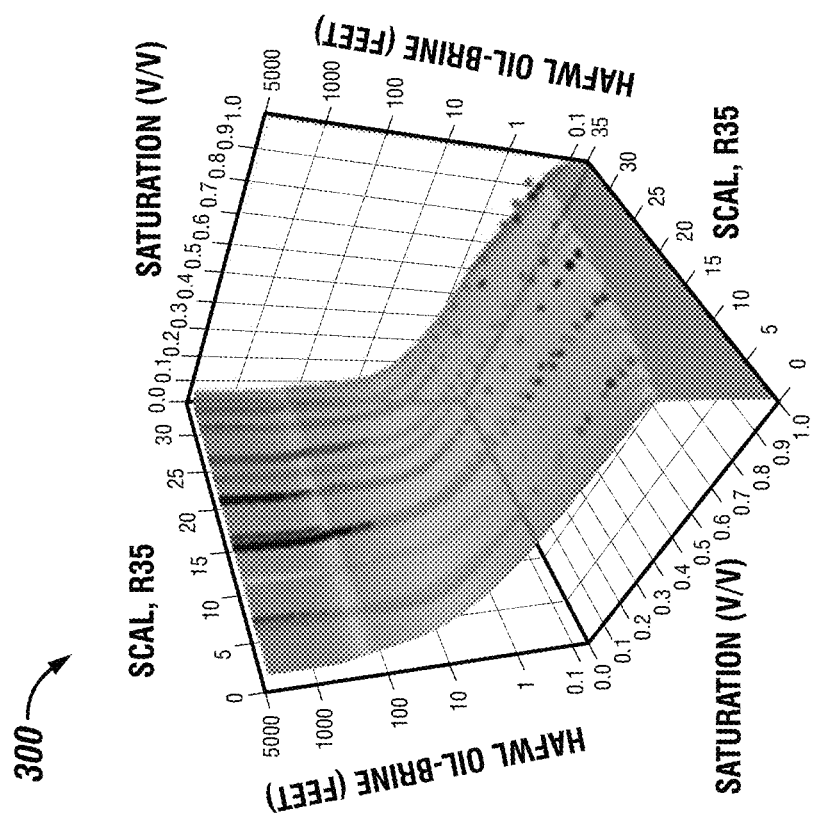
FIG. 3 are example three-dimensional (3-D) plots of fitted surfaces of water saturation height functions for each of the six different rock types depicted in FIG. 2.
Figure 3A:
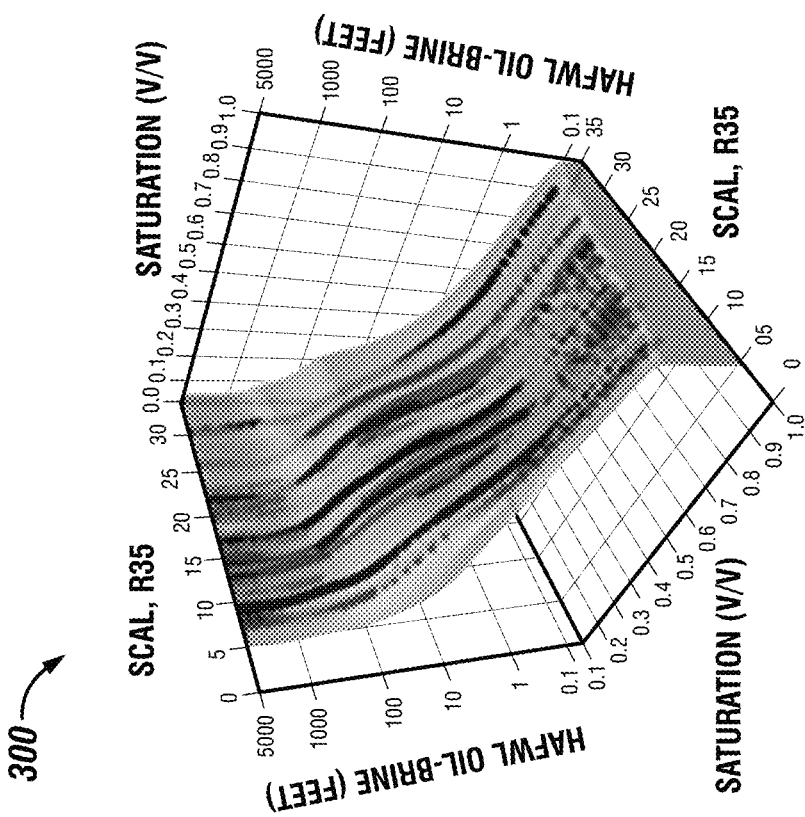
Figure 3D:
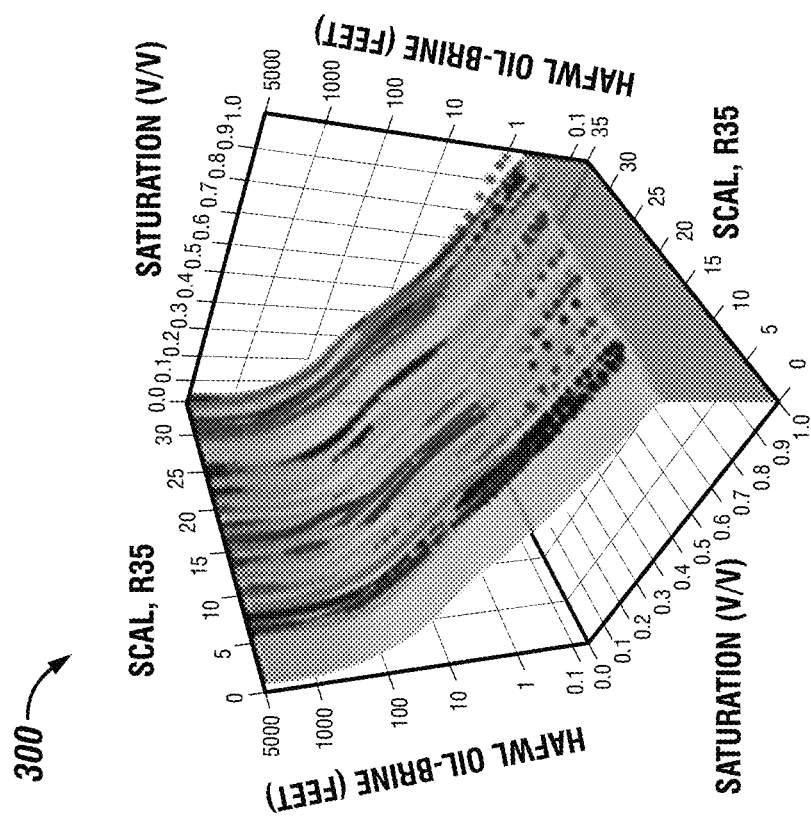
Figure 3C:
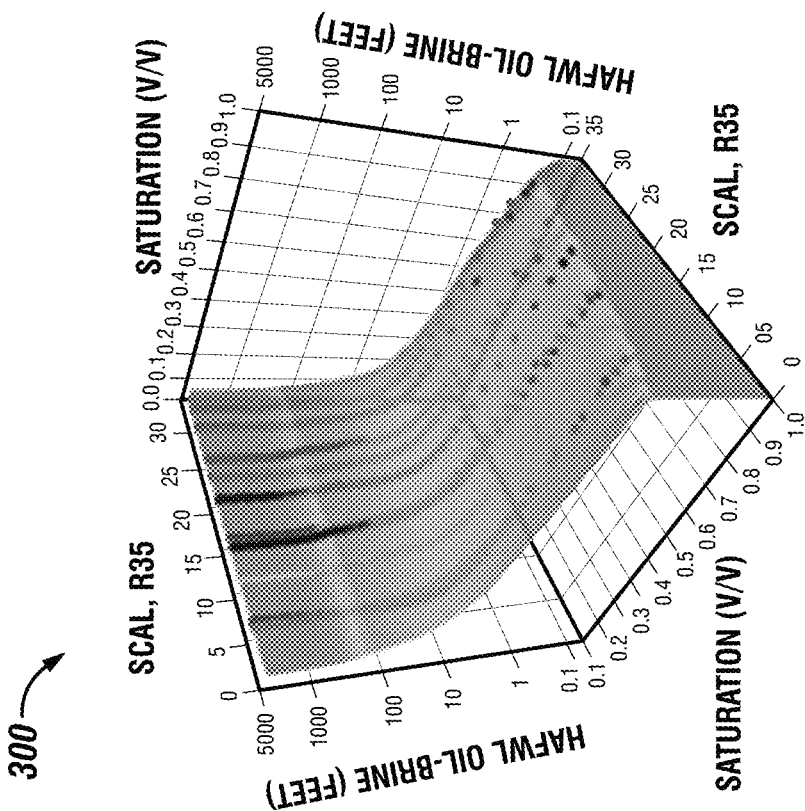
Figure 3F:
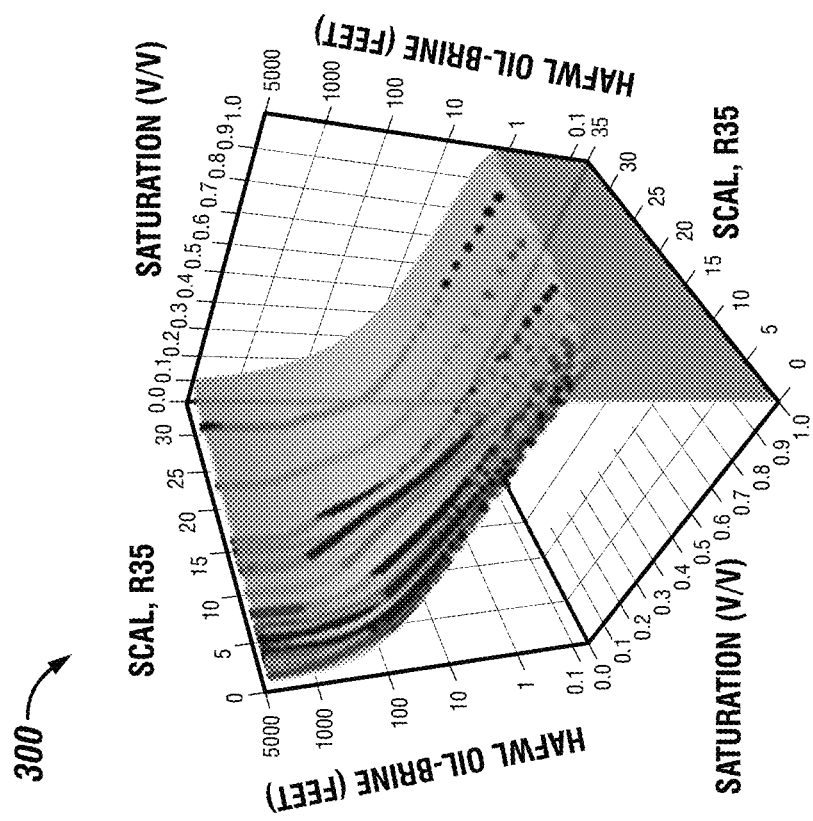
Figure 3E:
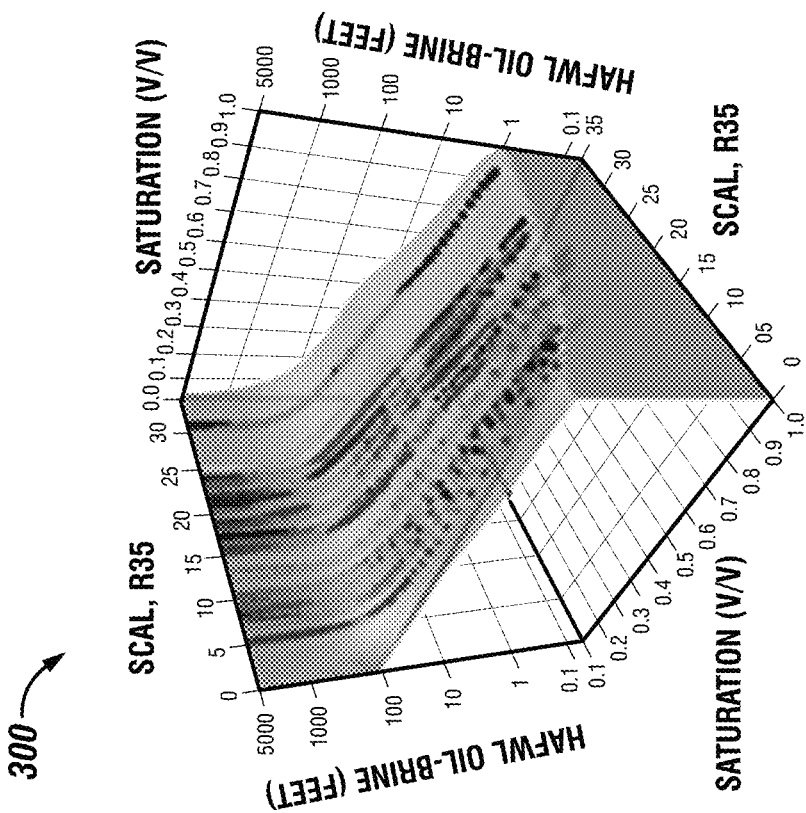
Figure 4:
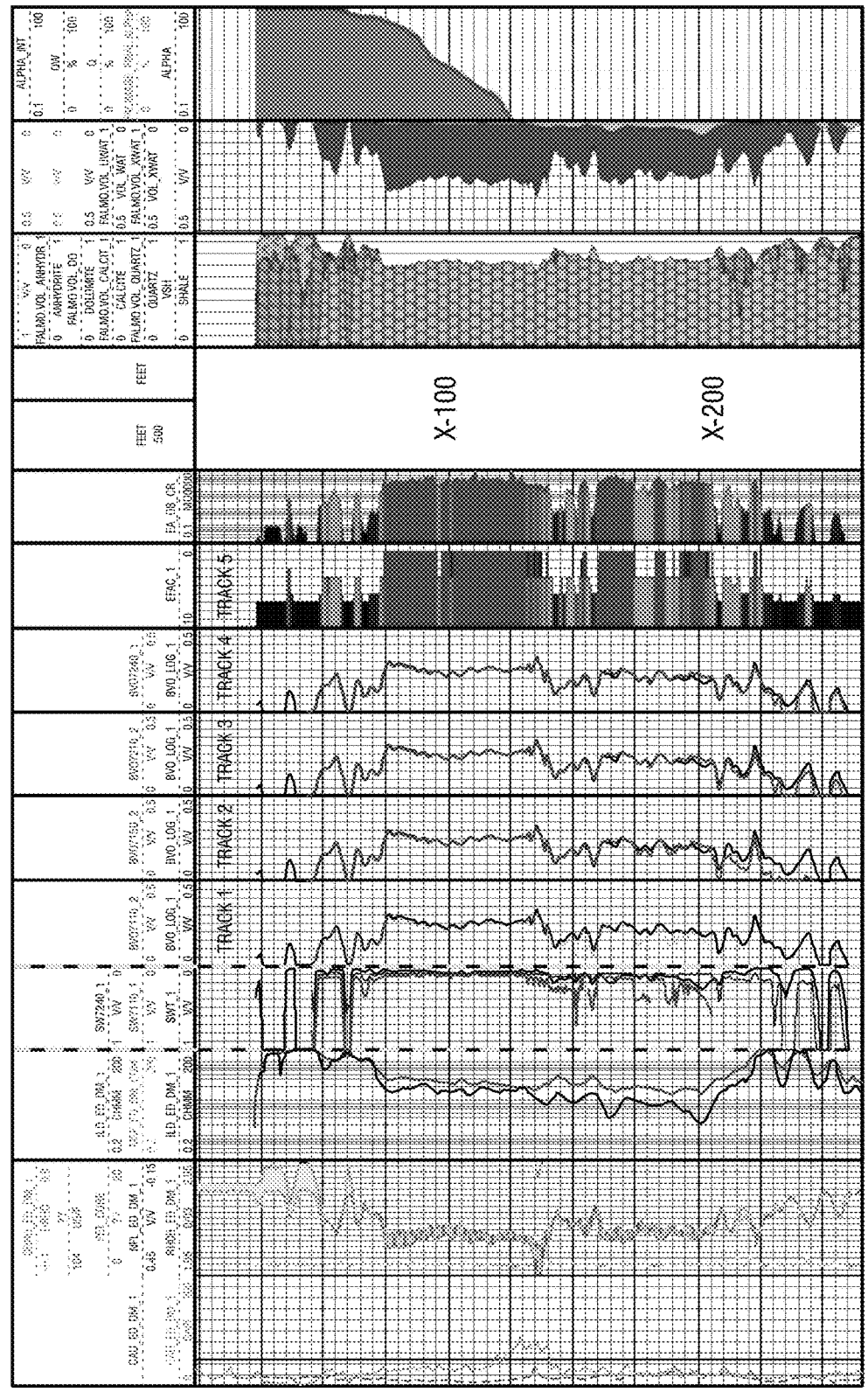
FIG. 4 are example well logs illustrating the use of porosity and permeability to define of different rock types.
Figure 5:
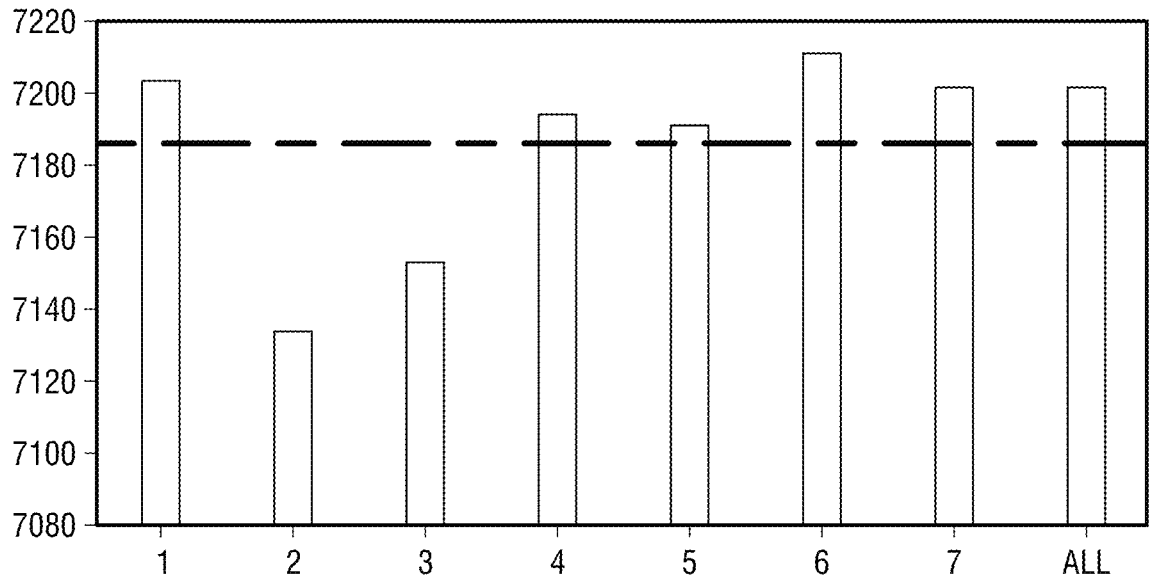
FIG. 5 is a bar graph of the free water level obtained by prior art error minimization techniques using seven different rock types.
Figure 6:
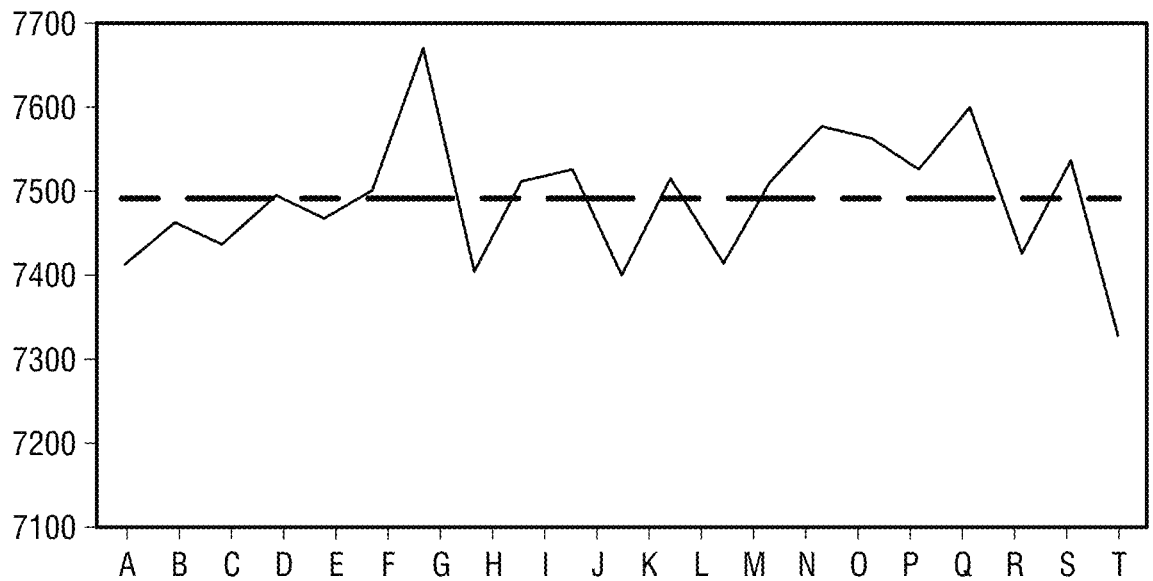
FIG. 6 is a plot of the calculated free water level based on a combination of all rock types in several wells using the prior art error minimization technique.

The present disclosure will now be described more fully hereinafter with reference to the accompanying drawings, which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art.

Embodiments of the disclosure address the disadvantages and limitations of existing free water level determination techniques, and more particularly, the error minimization technique described in detail above. As described in detail herein, embodiments of the disclosure include a determination of the free water level based on a comparison between the bulk volume of oil ($B_{vo}^{log}$) determined from logs and the bulk volume of oil ($B_{vo}^{calc}$) calculated from a saturation height function and that accounts for the different classified rock types (that is, facies). As discussed below, the determination of free water level may also determine the median and lowest error facies combination that produces the most accurate (that is, lowest error) free water level.

As used herein, the superscript notation "log" indicates that a particular parameter is derived from well logs (that is, from measurements taken directly in a well using known well logging techniques). As used herein, the superscript notation "calc" indicates that a particular parameter is calculated using, at least in part, functions (including models) of physical properties and not from well logs.

Determination of Free Water Level (FWL) from the Reference Bulk Volume of Oil and the Calculated Bulk Volume of Oil Initially, a reference bulk volume of oil ($B_{vo}^{log}$) may be determined from well logs such as the porosity and resistivity data obtained using wireline logging or logging while drilling (LWD) techniques. In some embodiments, the reference bulk volume of oil ($B_{vo}^{log}$) may be calculated from well log porosity ($\varphi_t^{log}$) and well log water saturation ($S_w^{log}$) from the well logs, as shown in Equation 1:

$$B_{vo}^{log} = \varphi_t^{log}(1 - S_w^{log}) \quad (1)$$

Where $B_{vo}^{log}$ is the reference bulk volume of oil, $\varphi_t^{log}$ is the well log porosity, and $S_w^{log}$ is the well log water saturation.

As described below, the calculated bulk volume of oil ($B_{vo}^{calc}$) may be determined for each facies of a reservoir using a water saturation calculated from a saturation height function and capillary pressures for that facies. As will be appreciated, the capillary pressures may be obtained from core samples obtained from a well. For example, a core sampling tool may be inserted into a well to obtain a core sample from a hydrocarbon-bearing reservoir. The core sample may be analyzed to determine the capillary pressure associated with a particular facies.

The free water level height (h) may be related to the capillary pressure within the reservoir ($P^{res}$) using the relationship shown in Equation 2:

$$P_c^{res} = 0.433(\rho_w - \rho_{hc})h = X_p h \quad (2)$$

Where $\rho_w$ is the brine density for a specific reservoir in grams per cubic centimeter (g/cc), $\rho_{hc}$ is the hydrocarbon density for a specific reservoir in g/cc, $P^{res}$ is the capillary pressure within the reservoir in pounds per square inch (psi), and h is the free water level in feet (ft).

For a given reservoir, the mercury injection capillary pressure ($P^c$) may be related to the reservoir capillary pressure ($P^{res}$) using the relationship described in Equation 3:

$$C_{res} = \frac{\sigma_{micp} * \cos(\theta_{micp})}{\sigma_{oil} * \cos(\theta_{oil})}, \quad P_c = C^{cres} P_c^{res} \quad (3)$$

Where $\sigma_{micp}$ is the surface tension between air and mercury, $\theta_{micp}$ is the contact angle between air and mercury, $\sigma_{oil}$ is the surface tension between air and oil, $\theta_{oil}$ is the contact angle, $P^c$ is the mercury injection capillary pressure, and $C^{res}$ is a conversion factor.

The calculated bulk volume of oil ($B_{vo}^{calc}$) may be calculated using Equation 4:

$$B_{vo}^{calc} = \varphi_t^{log}(1 - S_w^{calc}) \quad (4)$$

Where $\varphi_t^{log}$ is the porosity determined from well logs and $S_w^{calc}$ is the calculated water saturation. As described below, the calculated water saturation ($S_w^{calc}$) may be calculated from capillary pressure data for each of the facies using a selected saturation height function for each facie. That is, each facie may use the same saturation height function, may use a different saturation height function or any combinations thereof.

A least squares minimization may be performed on the calculated bulk volume of oil ($B_{vo}^{calc}$) and the reference bulk volume of oil ($B_{vo}^{log}$). In some embodiments, bounds for the height of the free water level may be imposed for the least squares minimization. In other embodiments, the height of the free water level may be unbounded for the least squares minimization. In some embodiments, an initial height of the free water level may be provided. The least squares minimization on the calculated bulk volume of oil ($B_{vo}^{calc}$) and the reference bulk volume of oil ($B_{vo}^{log}$) may be performed for all unique facies combinations, as shown in Equation 5:

$$N_c = \sum_{k=1}^{N_f} C_{N_f}^k - \sum_{k=1}^{N_f} \frac{N_f!}{k!(N_f - l)!} \quad (5)$$

Where $C^k$ is the combinatorial number, k is the number of facies, and N is the number of data points. For example, for 6 facies, the total number of combinations is 63. The calculations for the unique facies combinations are performed in the lexicographic order (for example, 1, 2, 3, 4, 5, and 6). In some embodiments, certain facies may be excluded such that the order is discontinuous, such as, for example, 1, 2, 4, 5, and 7.

As will be appreciated, the variability of the fit of the least squares minimization (that is the "goodness" of the fit) may be measured through the residue. The residue ($R_{sfc}$) may be defined for $N_{zc}$ data points as follows in Equations 6:

$$R_{zfc} = \sqrt{\sum_{j=1}^{N_{zfc}} \left(B_{voj}^{calc} - B_{voj}^{log}\right)^2}, \quad \overline{R}_{zfc} = R_{zfc}/N_{zfc} \quad (6)$$

Where $\overline{R}_{zfc}$ is the residue normalized with respect to the number of data points. As will be appreciated, the normalization with respect to the number of data points used for the calculation may be used as the number of data points ($N_{zfc}$) is a function of the facies combination.

As will be further appreciated, the least squares minimization may calculate the Jacobian of the objective function using a finite difference (forward or backward) or by evaluating the analytical derivative. In some embodiments, the least squares minimization is performed by evaluating the analytical derivative determined from Equations 2, 3, and 4, as described in Equation 7:

$$\frac{dB_{vo}^{calc}}{dh} = \varphi_t^{log} \frac{dS_w^{calc}}{dP_c} \frac{dP_c}{dh} = -0.433 \, C^{res} (\rho_w - \rho_o) \varphi_t^{log} \frac{dS_w^{calc}}{dP_c} \quad (7)$$

In some embodiments, the inversion may be based on the technique discussed in R. J. Hanson, *Least Squares with Bounds and Linear Constraints*, SIAM Journal of Scientific and Statistical Computing, vol. 7, no. 3, pp. 826-834 (1986). In other embodiments, the inversion may be based on Leveberg-Marquardt inversion, discussed in J. J. More et al., *User Guide for MINPACK-1*, Argonne National Laboratory Report ANL-80-74 (1980). In other embodiments, the inversion may be based on adaptive inversions, such as described in J. Dennis et al., *An Adaptive Nonlinear Least Squares Algorithm*, ACM Transactions on Mathematical Software, vol 7, no. 3 (1981). In other embodiments, the inversion may be based on other techniques, such as that described in P. Gill et al., *Algorithms for the Solution of the Non-linear Least-squares Problem*, SIAM Journal on Numerical Analysis, vol. 15, no. 5, pp. 977-991 (1978). In some embodiments, the calculations may be performed for a range of height of free water level at a constant step.

Calculated Water Saturation for Calculated Bulk Volume of Oil

As mentioned above, the calculated water saturation ($S_w^{calc}$) may be calculated from capillary pressure data for each of the facies using different techniques. Paragraphs [0047]-[0069] describe various saturation height functions that may be used with various embodiments of the disclosure. However, it should be appreciated that other embodiments may use different saturation height functions.

As noted above, saturation height functions may be derived from a curve or surface fit of capillary pressure data. Various saturation height functions are discussed below. In some embodiments, the saturation height functions are based on Winland's $r_{35}$ technique for the rock typing (that is, facies classification) that uses the relationship of capillary pressure to porosity and permeability. In other embodiments, other rock typing techniques may be used.

In some embodiments, a tri-modal model may be used as the saturation height function, as described in Equation 8:

$$S_w^{calc} = \alpha_1(R_{35}) + (1-\alpha_1((R_{35})) \times A_2(R_{35}, P_c) \times A_3(R_{35}, P_c) \times A_4(R_{35}, P_c) \quad (8)$$

Where $\alpha_1$ is a coefficient calculated by the surface fit and the general expression for $A_j(R_{35}; P_c)$ is of the form shown by Equation 9:

$$A_j(R_{35}, P_c) = \quad (9)$$
$$\begin{cases} 1 - e\left\{\frac{B_{j+N_A}(R_{35})}{\ln a_j(R_{35}) - \ln P_c}\right\} & \text{if } P_c - \alpha_j(R_{35}) > P_{lim}, \, j = 2, 3, 4 \\ 1 & \text{otherwise} \end{cases}$$

Wherein $P_{lim}$ is the entry pressure (usually equal to 0.1), and $N_A$ is the number of $A_j$ functions, that is, 3. $\alpha_1 (R_{35})$ may be expressed as shown in Equation 10:

$$\alpha_j(R_{35}) = a_j + b_j G_j(R_{35}), \text{ with } G_j(R_{35}) = \begin{cases} R_{35} \\ R_{35}^{c_j}, c_j \in ]-\infty, 0[ \\ \log_{10} R_{35} \end{cases} \quad (10)$$

$\beta_{j+N_A}(R_{35})$ may also be expressed in a form similar to Equation 10.

The derivative of $S_w^{calc}$ with respect to h used in Equation 7 may be determined by Equation 11 (omitting the dependency ($R_{35}; P_c$)):

$$\frac{dS_w^{calc}}{dh} = \left(1 - \alpha_1((R_{35}))\right)\frac{d(A_2 A_3 A_4)}{dP_c} = \quad (11)$$
$$\left(1 - \alpha_1((R_{35}))\right)\left(A_3 A_4 \frac{dA_2}{dP_c} + A_2 A_4 \frac{dA_3}{dP_c} + A_2 A_3 \frac{dA_4}{dP_c}\right)$$

Wherein, from Equation 9, $$\frac{dA_j}{dP_c}$$

is determined by Equation 12:

$$\frac{dA_j}{dP_c} = \begin{cases} -\frac{\beta_j(R_{35})}{P_c} \frac{e\left\{\frac{\beta_j(R_{35})}{\ln \alpha_j(R_{35}) - \ln P_c}\right\}}{[\ln \alpha_j(R_{35}) - \ln P_c]^2} \\ \quad \text{if } P_c - \alpha_j(R_{35}) > 0.10, \, j = 2, 3, 4 \\ 0 \quad \text{otherwise} \end{cases} \quad (12)$$

In some embodiments, a bi-modal water model may be used as the saturation height function. The bi-modal water saturation function may be the tri-modal function described above with $A_4(R_{35}; P_c) = 1$ and $N_A = 2$, as shown in Equation 13:

$$S_w^{calc} = \alpha_1(R_{35}) + (1-\alpha_1(R_{35})) \times A_2(R_{35}, P_c) \times A_3(R_{35}, P_c) \quad (13)$$

As will be appreciate, the bi-modal water saturation function may use Equations 9-12 discussed above, with $$\frac{dA_4}{dP_c} = 0$$

in Equation 7.

In some embodiments, an equivalent radius model (EQR) model may be used as the saturation height function, as described in Equation 14:

$$S_w^{calc} = \begin{cases} 1 - (1 - \alpha_2(R_{35}))\left(1 - \frac{\alpha_3(R_{35})\alpha_1(R_{35})}{P_c}\right)\left(1 - \left(\frac{\alpha_1(R_{35})}{P_c}\right)^{\alpha_4(R_{35})}\right) \\ \qquad\qquad\qquad\qquad\qquad\qquad\qquad\text{if } P_c \geq \alpha_1(R_{35}) \\ 1 \qquad\qquad\qquad\qquad\qquad\qquad\qquad\text{otherwise} \end{cases}$$ (14)

Where, for j=1, 2, 3, and 4, $\alpha_j(R_{35})$ is determined by Equation 10. In contrast to the previously described functions, $N_A=0$. The derivative of $S_w^{calc}$ with respect to $P_c$ used in Equation 7 when $P_c \geq A_1$ may be expressed by Equation 15:

$$\frac{dS_w^{calc}}{dh} = \begin{cases} -\frac{1-\alpha_2}{P_c^2}\left[\alpha_1\alpha_3 + \left(\frac{\alpha_1}{P_c}\right)^{\alpha_4}(\alpha_4 P_c - \alpha_1\alpha_3(1+\alpha_4))\right] & \text{if } P_c \geq \alpha_1 \\ 0 & \text{otherwise} \end{cases}$$ (15)

Where the terms $\alpha_j$ represent $\alpha_j(R_{35})$.

In some embodiments, the Thomeer model may be used as the saturation height function, as described in Equation 16:

$$S_w^{calc} = \begin{cases} \alpha_2(R_{35}) + (1 - \alpha_1((R_{35}))\left(1 - e^{\frac{\alpha_3(R_{35})}{\ln \alpha_1(R_{35}) - P_c}}\right) & \text{if } P_c - \alpha_1((R_{35})) > P_{lim} \\ 1 & \text{otherwise} \end{cases}$$ (16)

Where $\alpha_j(R_{35})$ for j=1, 2, 3, and 4 are determined by Equation 10 with $N_A=0$. The derivative of $S_w^{calc}$ with respect to $P_c$ used in Equation 7 may be expressed by Equation 17:

$$\frac{dS_w^{calc}}{dh} = \begin{cases} -(1-\alpha_2((R_{35}))\alpha_3((R_{35})\frac{e^{\frac{\alpha_3(R_{35})}{\ln \alpha_1(R_{35})-P_c}}}{P_c[\ln \alpha_1((R_{35})) - \ln P_c]^2} & \text{if } P_c - \alpha_1((R_{35})) > P_{lim} \\ 0 & \text{otherwise} \end{cases}$$ (17)

In some embodiments, the Brooks-Corey model may be used as the saturation height function, as described in Equation 18:

$$S_w^{calc} = \alpha_1(R_{35}) + (1 - \alpha_1(R_{35}))\left(\frac{\alpha_2((R_{35})}{P_c}\right)^{1/\alpha_3((R_{35})}$$ (18)

Where $\alpha_j(R_{35})$ for j=1, 2, 3, and 4 are determined by Equation 10 with $N_A=0$. The derivative of $S_w^{calc}$ with respect to $P_c$ used in Equation 7 may be expressed by Equation 19:

$$\frac{dS_w^{calc}}{dh} = -\frac{(1 - \alpha_1(R_{35}))[\alpha_3(R_{35})]^{1/\alpha_4(R_{35})}}{\alpha_3(R_{35})}\frac{1}{P_c^{1+1/\alpha_4(R_{35})}}$$ (19)

In some embodiments, a modified Johnson model may be used as the saturation height function, as described in Equation 20:

$$S_w^{calc} = 10^{-\alpha_1(R_{35})\ln P_c + \alpha_2(R_{35})}$$ (20)

The derivative of $S_w^{calc}$ with respect to $P_c$ used in Equation 7 may be expressed by Equation 21:

$$\frac{dS_w^{calc}}{dh} = -\frac{\alpha_1(R_{35}) \ln(10)}{P_c}10^{-\alpha_1(R_{35})\ln P_c + \alpha_2(R_{35})}$$ (21)

In some embodiments, the Lambda model may be used as the saturation height function, as described in Equation 22:

$$S_w^{calc} = \alpha_1(R_{35}) + \alpha_2(R_{35})P_c^{-\alpha_3(R_{35})}$$ (22)

For the Lambda model, the derivative of $S_w^{calc}$ with respect to $P_c$ used in Equation 7 may be expressed by Equation 23:

$$\frac{dS_w^{calc}}{dh} = -\alpha_2(R_{35})\alpha_3(R_{35})P_c^{-1-\alpha_3(R_{35})}$$ (23)

In some embodiments, the Skelt-Harrison model may be used as the saturation height function, as described in Equation 24:

$$S_w^{calc} = 1 - \alpha_1(R_{35})e^{-\left(\frac{\alpha_2(R_{35})}{\alpha_3(R_{35})+h}\right)^{\alpha_4(R_{35})}}$$ (24)

Where $\alpha_j(R_{35})$ for j=1, 2, 3, and 4 are determined by Equation 10 with $N_A=0$. For the Skelt-Harrison model, the derivative of $S_w^{calc}$ with respect to $P_c$ used in Equation 7 may be expressed by Equation 25:

$$\frac{dS_w^{calc}}{dh} = -\frac{\alpha_1(R_{35})\alpha_4(R_{35})[\alpha_2(R_{35})]^{\alpha_4(R_{35})}}{(\alpha_3(R_{35})+h)^{1+\alpha_4(R_{35})}}e^{\left(\frac{\alpha_2(R_{35})}{\alpha_3(R_{35})+h}\right)^{\alpha_4(R_{35})}}$$ (25)

In some embodiments, the Leverett model may be used as the saturation height function, as described in Equation 26:

$$S_w^{calc} = \alpha_1(R_{35}) + \frac{1-\alpha_2(R_{35})}{D^{\alpha_4(R_{35})}}\frac{\alpha_3(R_{35})}{P_c^{\alpha_4(R_{35})}}, \text{ where } D = \sqrt{\frac{k}{\varphi_t^{log}}}$$ (26)

Where $\alpha_j(R_{35})$ for j=1, 2, 3, and 4 are determined by Equation 10 with $N_A=0$ and k is the permeability. For the Leverett model, the derivative of $S_w^{calc}$ with respect to $P_c$ used in Equation 7 may be expressed by Equation 27:

$$\frac{dS_w^{calc}}{dh} = -\frac{(1-\alpha_2(R_{35}))\alpha_3\alpha_4(R_{35})}{D^{\alpha_4(R_{35})}}\frac{1}{P_c^{1+1/\alpha_4(R_{35})}} \quad (27)$$

Systems and Process for Determining Free Water Level

Figure 7:
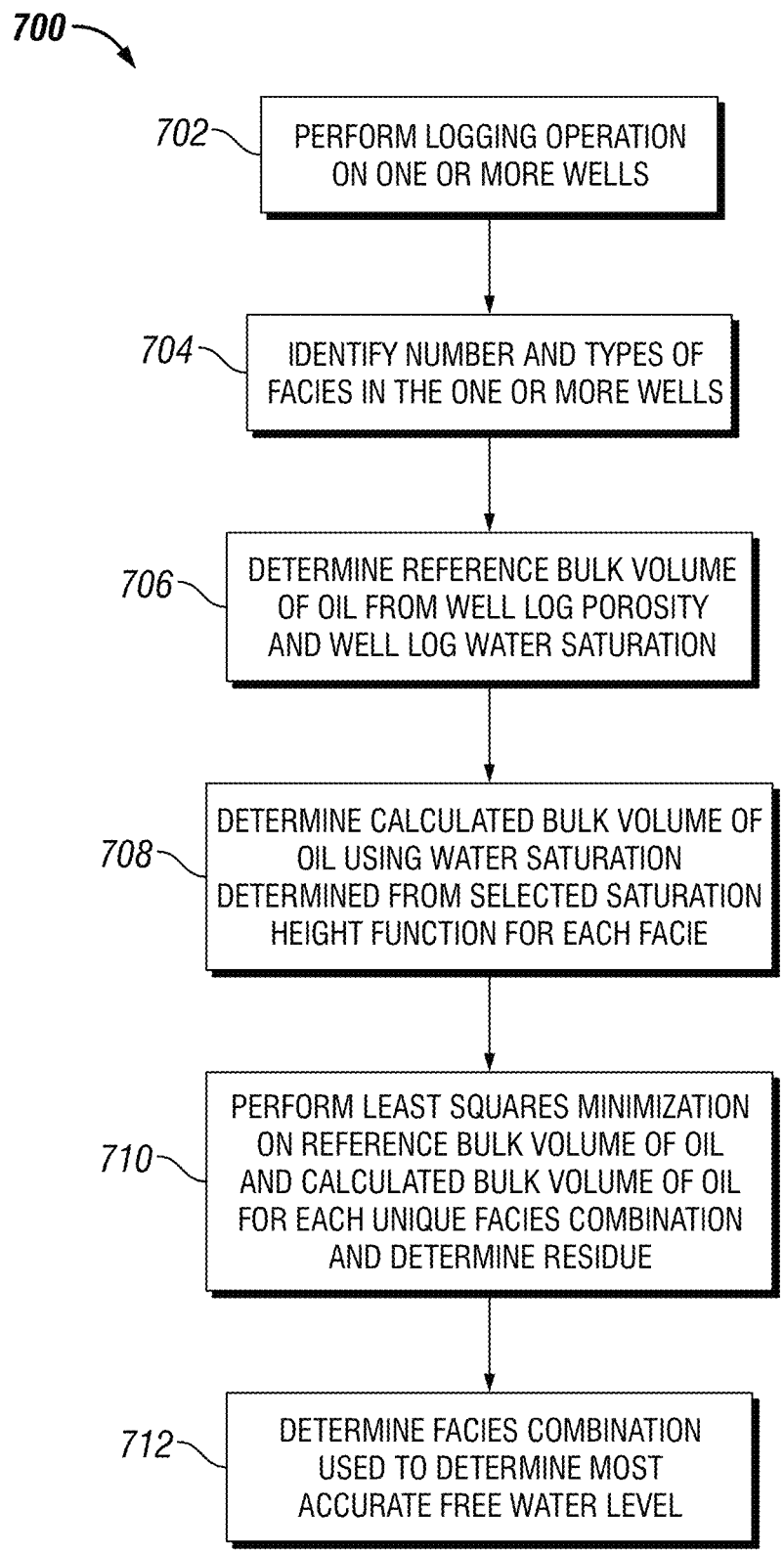
FIG. 7 is a block diagram of a process for determining the free water level of a hydrocarbon-bearing reservoir in accordance with an embodiment of the disclosure.

FIG. 7 depicts a process 700 for determining the free water level of a hydrocarbon-bearing reservoir in accordance with an embodiment of the disclosure. Initially, a logging operation may be performed on one or more wells (block 702) to produce well logs. As appreciated by those of ordinary skill in the art, such well logging operations may include wireline logging, logging while drilling (LWD), or use of other known tools or techniques. The well logs may include properties of reservoir rock, such as porosity and water saturation.

Next, the number and types of facies in the one or more wells may be identified (block 704) using, for example, well log data, core analysis, or both. For example, in some embodiments, the facies may be classified (that is, assigned a type) Winland's $r_{35}$ technique for the rock typing (that is, facies classification) using the relationship of capillary pressure to porosity and permeability. In other embodiments, different facies classification techniques may be used.

As shown in FIG. 7, the reference bulk volume of oil may be determined from well log porosity and well log water saturation for each identified facie (block 706). For example, Equation 1 shown above describes the determination of the reference bulk volume of oil from well log porosity and well log water saturation. Additionally, the bulk volume of oil ("calculated bulk volume of oil) may be calculated using a water saturation determined from a selected saturation height function for each facie (block 708). For example, Equation 1 shown above describes the determination of the reference bulk volume of oil from well log porosity and well log water saturation. As also described above, the selected saturation height function may include, for example a trimodal model saturation height function (as described in Equations 8-12), a bi-modal saturation height function (as described in Equations 13 and using Equations 9-12), an equivalent radius model (EQR) saturation height function (as described in Equations 14-15), the Thomeer model saturation height function (as described in Equations 16-17), the Brooks-Corey model saturation height function (as described in Equations 18-19), a modified Johnson model saturation height function (as described in Equations 20-21), the Lambda model saturation height function (as described in Equations 22-23), the Skelt-Harrison model saturation height function (as described in Equations 24-25), and the Levrett model saturation height function (as described in Equations 26-27). In other embodiments, other saturation height functions may be used to determine the calculated bulk volume of oil.

To determine the free water level from the reference bulk volume of oil and the calculated bulk volume of oil, a least squares minimization may be performed on the reference bulk volume of oil and the calculated bulk volume of oil for each unique facies combination (as shown by Equation 6), and the residue from the least squares minimization (as shown by Equation 7) may be determined (block 710). In some embodiments, the calculation of the Jacobian of the objective function for the least squares minimization is performed by evaluating the analytical derivative determined from Equations 2, 3, and 4 (as shown in Equation 7). In some embodiments, the facies combination that may be used to determine the most accurate free water level (that is, the lowest error as indicated by the lowest residue) is determined (block 712).

In some embodiments, the determination of free water level described herein may be implemented in a processing system having a processor, memory, and a display. For example, such embodiments may include a graphical user interface (GUI) that receives inputs and provides outputs to implement the determination of free water level in accordance with the techniques described herein.

Figure 8:
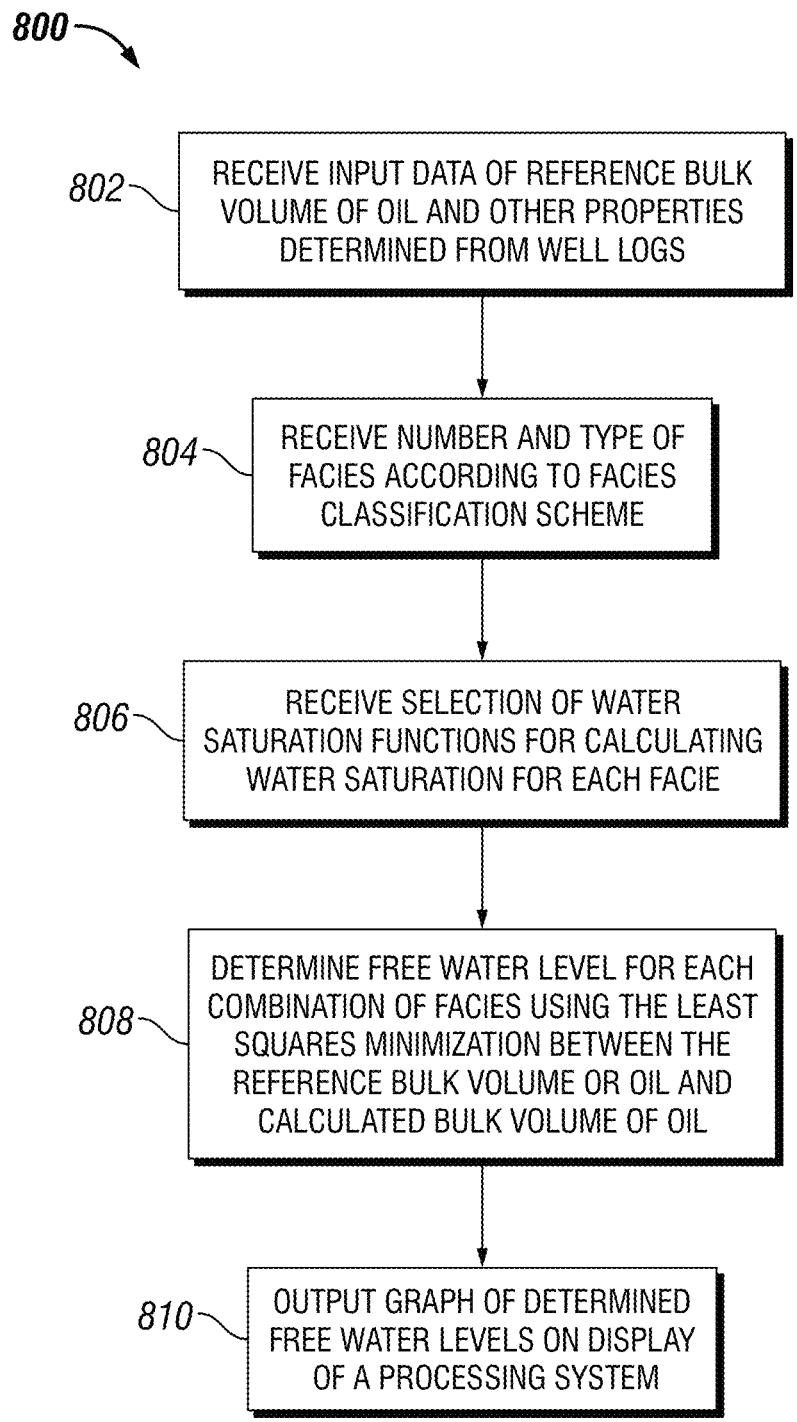
FIG. 8 is a block diagram of a process for determining free water level in accordance with an embodiment of the disclosure.

FIG. 8 depicts a process 800 for determining free water level in accordance with an embodiment of the disclosure. In some embodiments, one or more steps of the process 800 may be implemented in a free water level processing system, such as the free water processing system 1504 discussed below and having, for example, a processor, a memory, and a display.

As shown FIG. 8, input data of the reference bulk volume of oil, porosity, resistivity, and other properties determined from well logs may be received (block 802). Next, the number and types of facies according to a facies classification scheme may be received (block 804). The selection of the water saturation functions for calculating the water saturation for each facie may be received (block 806). Next, the free water level for each combination of facies may be determined using the least squares minimization between the reference bulk volume or oil and calculated bulk volume of oil (block 808), as described herein. As also discussed herein, such determinations may include a calculation of the error residue for the least squares minimization. In some embodiment, the combination of facies that provide the lowest error residue may be determined. In some embodiments, the median facies combination that provides the lowest error residue may be determined. In some embodiments, a graph of the free water level determinations may be output on a display of a processing system (block 810).

Figure 9:
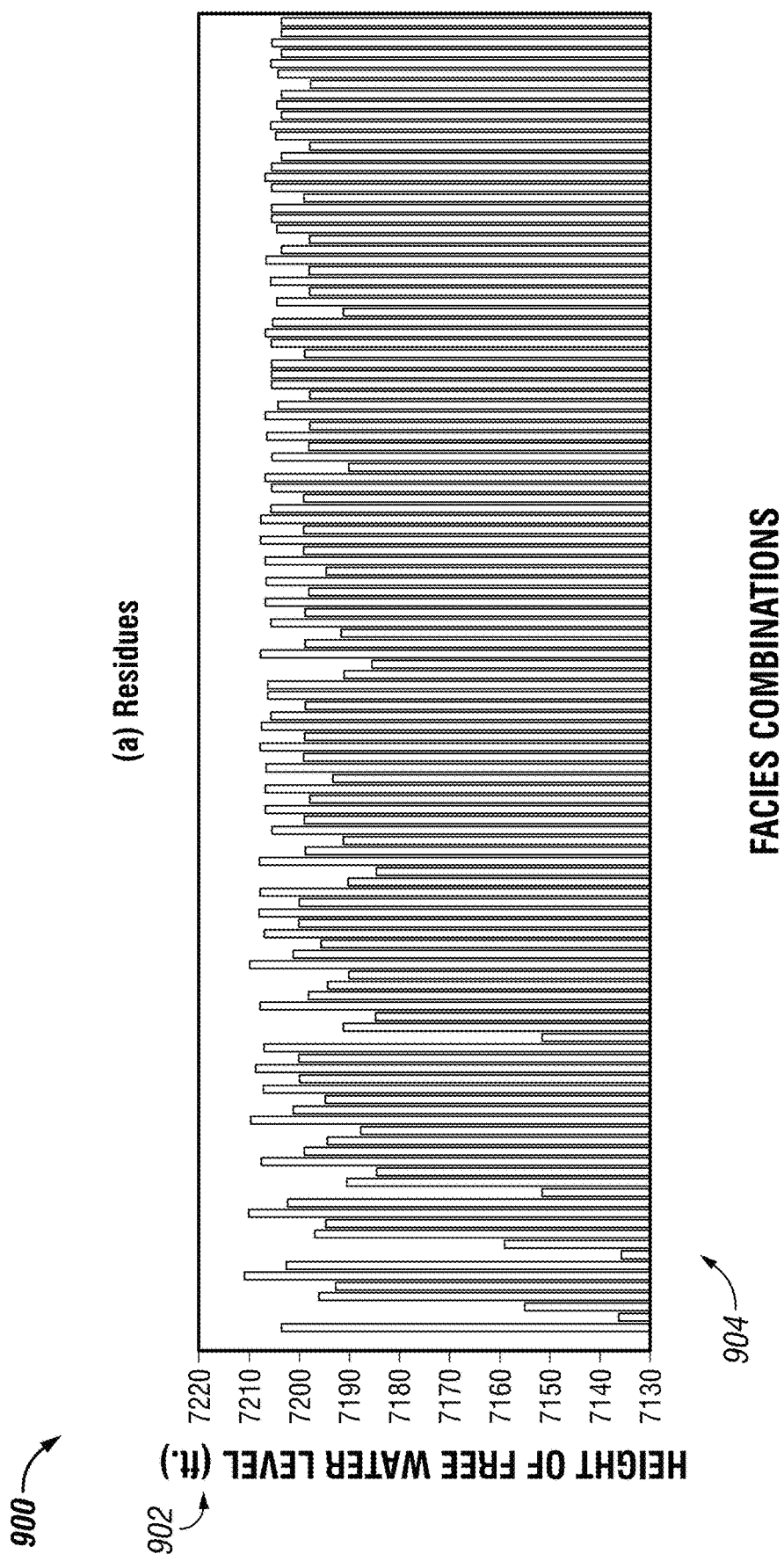
FIG. 9 is a bar graph of free water level determinations for a lexicographic order of seven facies in an example well in accordance with an embodiment of the disclosure.

For example, a graph may include the determined free water level for each unique combination of facies. FIG. 9 depicts a bar graph 900 illustrating the free water level determinations for a lexicographic order of 7 facies in an example well. In such an embodiment, the 7 facies classifications result in a 127 different combinations of facies. As shown in FIG. 9, the determined free water level for each facies combination is depicted on the y-axis 902, and each unique combination of facies is depicted on the x-axis 904. By way of example, as shown in FIG. 7, the combination of facies numbers 1, 2, and 6 provide for the most accurate free water level in the example well.

Figure 10:
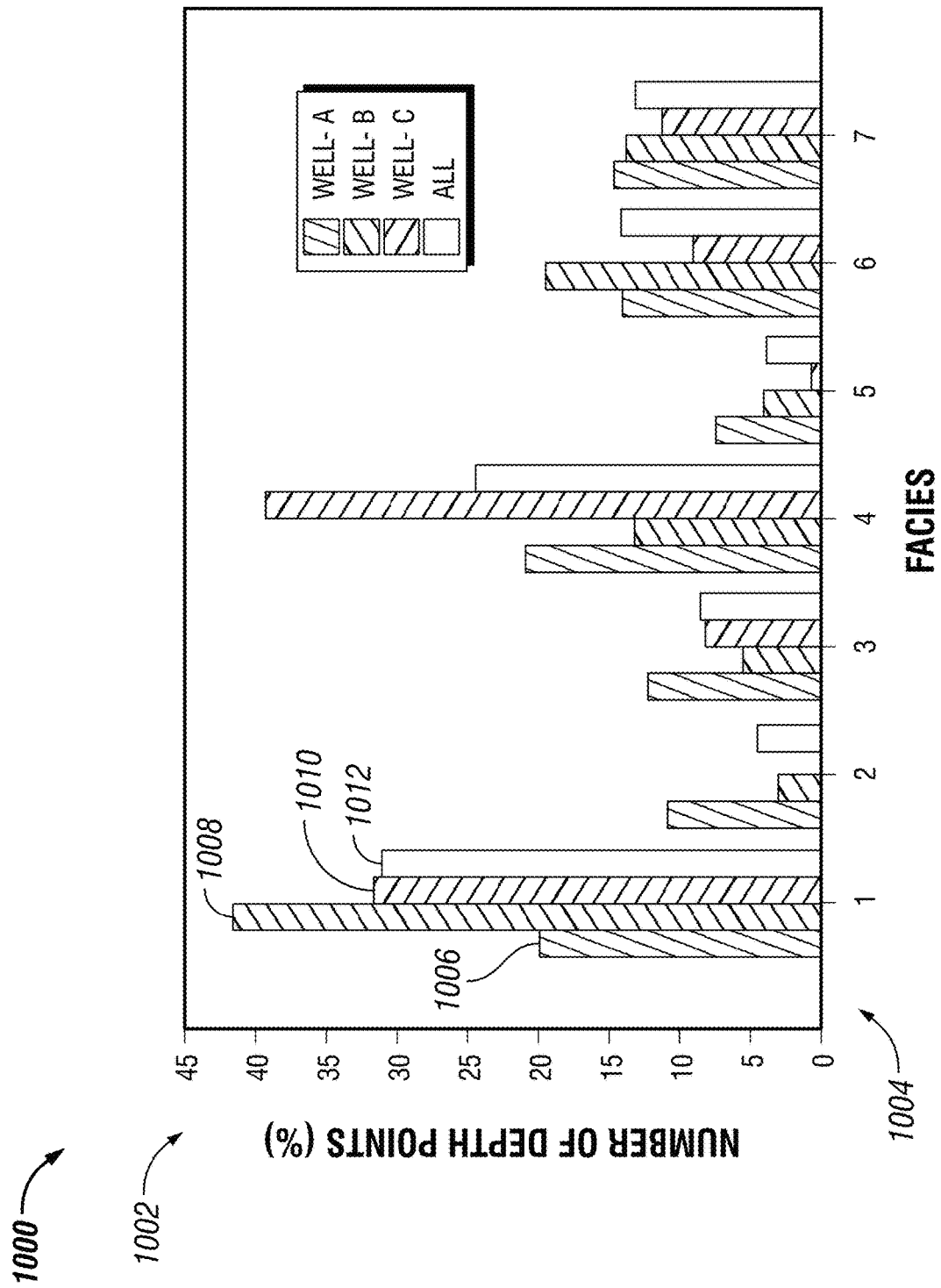
FIG. 10 is a bar graph of the relative percentage of facies present in three example wells in an example well in accordance with an embodiment of the disclosure.

In some embodiments, as noted herein, the determination of free water level may be performed for multiple wells, such that a certain region or an entire region of a reservoir may be analyzed. In such embodiments, a graph (for example, a bar graph) of the number of facies in each well may be generated. FIG. 10 depicts a bar graph 1000 illustrating the relative percentage of facies (as indicated by the number of depth points) present in three example wells (Well-A, Well-B, and Well-C. As shown in FIG. 9, the number of depth points (in relative percentage) is depicted on the y-axis 1002 and the facies 1-7 are depicted on the x-axis 1004. Each group of four bars for each facie indicates the relative percentage of that facie in Well-A (for example, bar 1006), in Well-B (for example, bar 1008), in Well-C (for example, bar 1010), and for all wells together (for example, bar 1012).

FIGS. 11-14 depict example user interface elements from a graphical user interface for a process for determining free water level in accordance with embodiments of the disclosure. In some embodiments, for example, the user interface screens depicted in FIGS. 11-14 and described below may be presented sequentially in a graphical user interface. In such embodiments, the graphical user interface may receive input data for a free water level determination in accordance with the techniques described herein.

Figure 11:
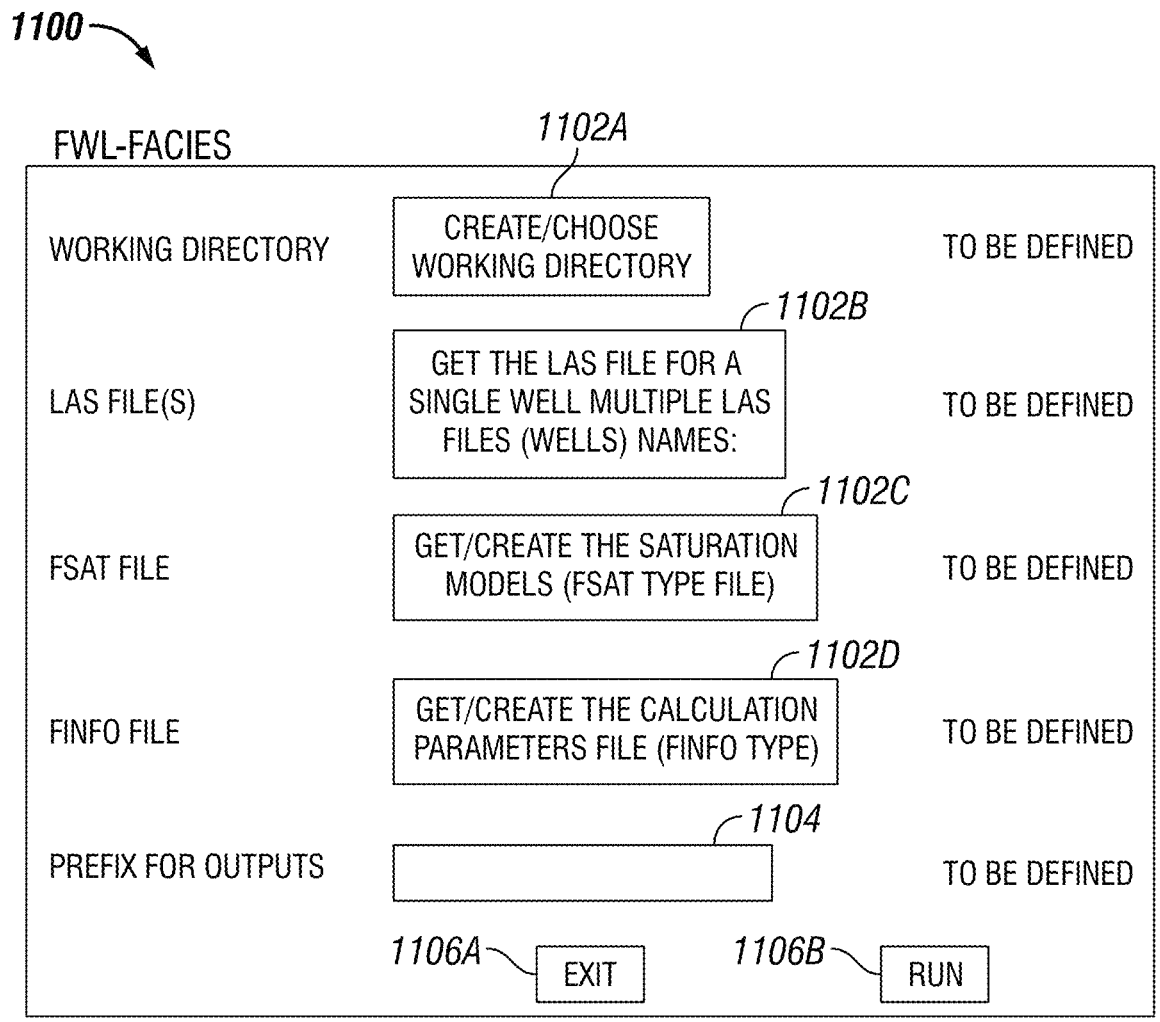

FIG. 11 depicts a screen 1100 in which various inputs to a process for determining free water level may be selected. For example, as shown in FIG. 11, various user-selectable elements (for example, buttons 1102) may enable the selection of directories, input files, and the like from an electronic location (for example, a file location, a directory, a network location) accessible by a computer. In some embodiments, for example, the screen 1100 may include selection of a working directory via button 1102A, selection of a Las file(s) via button 1102B (as will be appreciated by those of ordinary skill in the art, a *.las file may define a well), selection of an fsat file via button 1102C (as will be appreciated by those of ordinary skill in the art, a *.fsat file may define water saturation models), and selection of a finfo file via button 1102D (as will be appreciated by those of ordinary skill in the art, a *.finfo file may define calculation parameters). In some embodiments, the screen 1100 may include a user interface element (for example, text field 1104) that provides for input of a prefix for generated output files. The user interface element may include user interface elements (for example, buttons 1106A and 1106B) that provide for exit ("Exit") of the process and execution ("Run") of the process.

Figure 12:
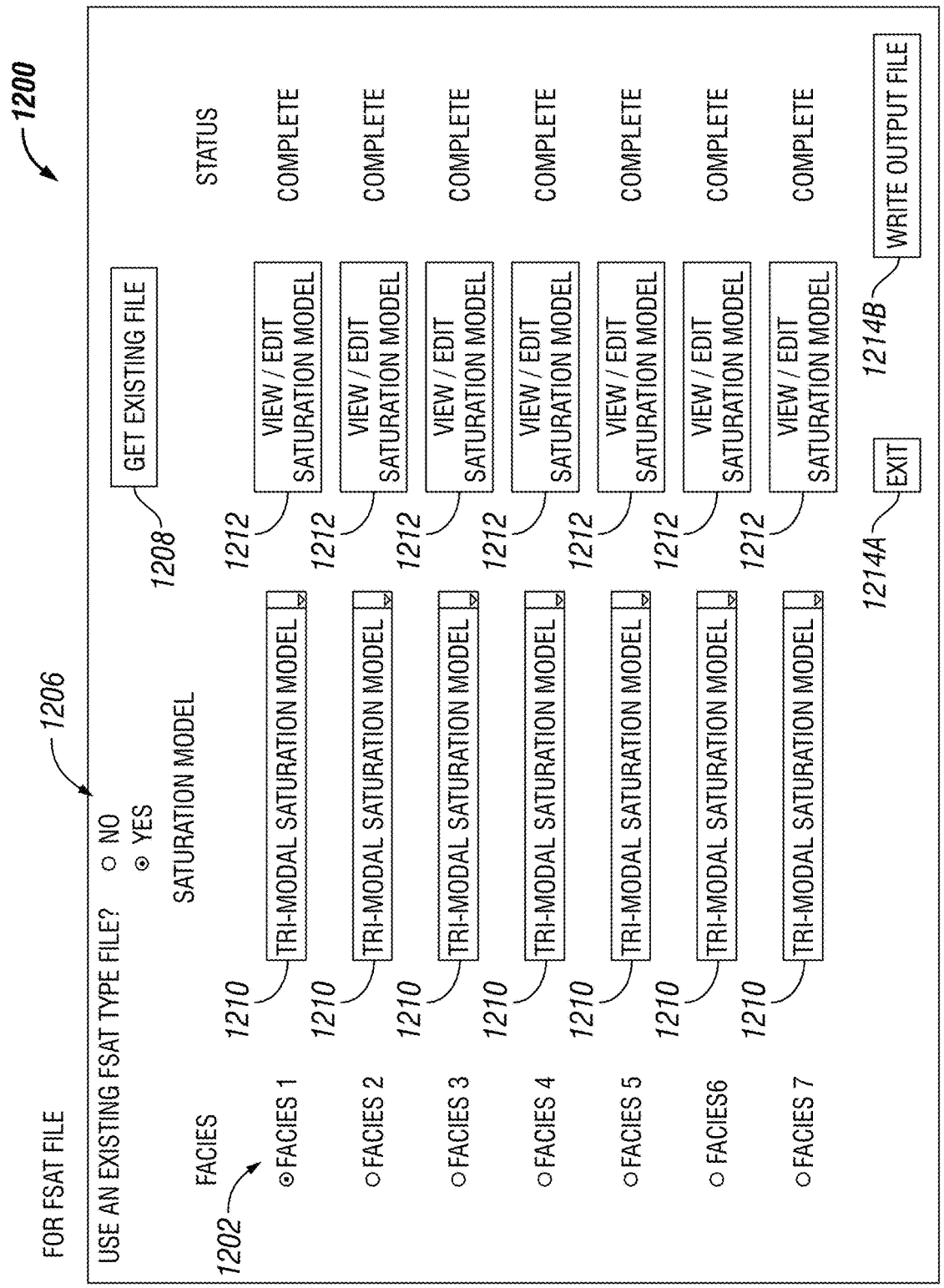

FIG. 12 depicts a screen 1200 in which water saturation model may be selected for a respective facie in accordance with embodiments of the disclosure. For example, the screen 1200 shown in FIG. 12 depicts seven facies 1202 (for example, Facie 1, Facie 2, Facie 3, Facie 4, Facie, 5, Facie 6, and Facie 7) selectable by a user interface element (for example, radio buttons 1204). The screen 1200 provides for use of an existing fsat file having water saturation functions via a user interface elements (for example, radio buttons 1206 and button 1208).

As discussed above, a water saturation function may be used to calculate water saturation (and subsequently, the calculated bulk volume of oil) for each facie. Each facie may use a different water saturation model or the same water saturation model. As shown in FIG. 12, the screen 1200 may provide for the selection of a water saturation model via a user interface element (for example, dropdown boxes 1210 may enable the selection of a water saturation model). In some embodiments, the dropdown boxes 1210 may be populated by the water saturation models included in a selected fsat file. Additionally, the screen 1200 may provide for the viewing or editing of a selected saturation model via a user interface element (for example, buttons 1212), as shown in FIG. 13 and as described below. The screen 1200 may include user interface elements (for example, buttons 1214A and 1214B) that provide for exit ("Exit") of the process and generation of outputs ("Write output file") of the process.

FIG. 13 depicts a screen 1300 illustrating the viewing and editing of a selected water saturation model (for example, selected via one of the dropdown boxes 1208) in accordance with embodiments of the disclosure. In the embodiment shown in FIG. 13, the tri-modal water saturation model is depicted in a definition section 1302. Additionally, as shown in parameters section 1304, various parameters for the selected tri-modal water saturation model via user interface elements (for example, text fields 1306). The screen 1300 may include user interface elements (for example, buttons 1308A and 1308B) that provide for returning to a previous screen without saving values input on screen 1300 ("Return View No Save") or saving values ("Return and Save") of the process.

Figure 14:
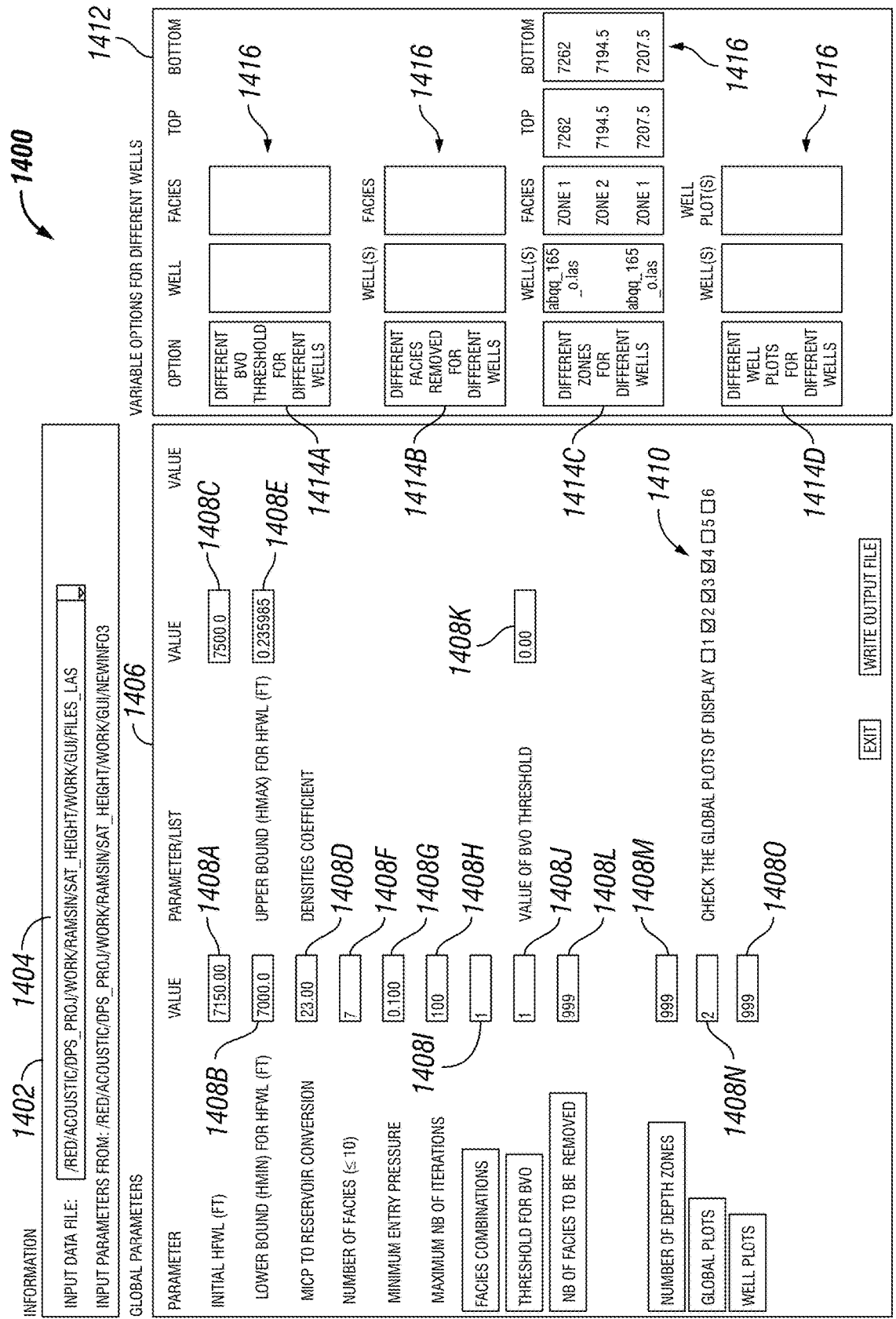

FIG. 14 depicts another screen 1400 of an example graphical user interface in which various parameters and options for a process for determining free water level may be provided in accordance with an embodiment of the disclosure. As shown in FIG. 14, the screen 1400 provides for the selection of an input data file in section 1402 via a user interface element (for example dropdown box 1404). The screen 1400 also provides for the selection of various parameters in section 1406 via user interface elements (for example, text fields 1408 and checkboxes 1410). In some embodiments, for example, the screen 1400 may provide for input of an initial free water level height (hfwl) via text field 1408A, a lower bound for the free water level height via text field 1408B, an upper bound for the free water level via text field 1408C, an MICP to reservoir conversion factor via text field 1408D, the densities coefficient via text field 1408E, the number of facies via text field 1408F, the minimum entry pressure via text field 1408G, the maximum number of iterations via text field 1408H, the number of facies combinations via text field 1408I, the threshold for bulk volume of oil via text field 1408J, the value of the bulk volume of oil threshold via text field 1408K, and the number of facies to be removed via text field 1408L. Additionally, the screen 1400 may provide for the number of depth zones via text field 1408M, the number of global plots via text field 1408N, and the number of well plots via text field 1408O.

The screen 1400 also provides for the selection of various options for different wells in section 1412 via user interface elements (for example, buttons 1414 and text fields 1416. For example, these user interface elements provide for selection of a different bulk volume of oil threshold for different wells (via button 1414A), the removal of different facies for different wells (via button 1414B), the selection of different zones for different wells (via button 1414C), and selection of different well plots for different wells (via button 1414D).

Figure 15:
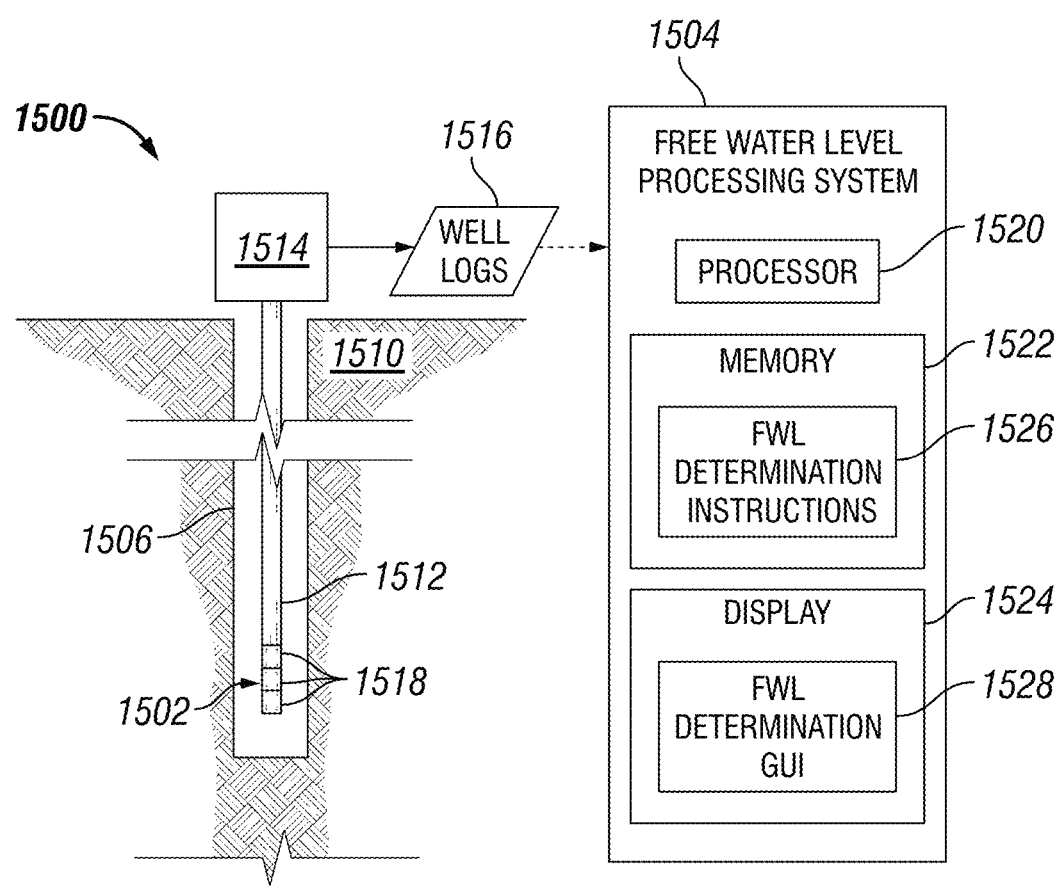
FIG. 15 is a schematic diagram of a well site having a wireline tool and a free water level (FWL) processing system in accordance with an embodiment of the disclosure.

FIG. 15 depicts a well site 1500 having illustrating a wireline tool 1502 and a free water level (FWL) processing system 1504 in accordance with an embodiment of the disclosure. In the illustrated embodiment, the wireline tool 1502 is inserted in a wellbore 1506 of a extending into a formation 1510. The wellbore 1506 may be, for example, the wellbore 1506 of an exploration well, a crestal well, or other types of wells drilled to explore a reservoir.

As shown in FIG. 15, the wireline tool 1502 is suspended on a wireline 1512. The wireline 1512 may include a conductor and may enable data transmission between the wireline tool 1502 and a wireline monitoring and control system 1514. The wireline 1512 may be raised and lowered within the well 1508 to various depths using devices known in the art, such as a reel and drum apparatus in a service truck having the various components of a wireline system. The monitoring and control system 1514 may control operation of the wireline tool 1502 in the wellbore 1506 and may receive data from wireline tool 1502 to produce well logs 1516. For example, the monitoring and control system 66 may include one or more computer systems or devices.

The wellbore 1506 may include any form of a hole formed in a geologic formation, such as for the purpose of locating and extracting hydrocarbons or other resources from the formation 1510. For example, the formation 1510 may include an oil and gas reservoir, and the wellbore 1506 may include a wellbore drilled into the formation 1510 for the purpose of locating and obtaining information about the oil, gas and other hydrocarbons in the reservoir.

Although the embodiment shown in FIG. 15 depicts a wireline tool, in other embodiments other well logging tools may be used. For example, in some embodiments, similar tools (or tools having similar measurement capabilities) can be incorporated into a logging-while-drilling LWD apparatus. A LWD tool may have components or functionality in common with wireline tools (for example, transmitting and receiving antennas, sensors, etc.), but may be designed and constructed to endure and operate during drilling.

The wireline tool 1502 may include modules 1518 that enable the measurement of various properties and generation of the well logs. For example, the wireline tool 1502 may include electromagnetic (resistivity) tools, nuclear tools, acoustic tools, and nuclear magnetic resonance (NMR) tools, and other tools. Such modules 1514 may include known components for operation of these modules, such as sensors, antennas, receivers, transmitters, fluid samplers, etc. In some embodiments, the wireline tool 1502 may measure and produce logs of resistivity, porosity, and other measurements that may be used by the FWL processing system 1504 to determine a reference bulk volume of oil, a calculated bulk volume of oil, and a free water level, as described herein.

In some embodiments, the FWL processing system 1502 may be used to determine the free water level associated with a reservoir accessed by the wellbore 1506 based on the well logs and using the techniques described herein. The free water level may then be used to further plan and perform exploration, management, and assessment of the reservoir.

FIG. 15 also depicts components of the FWL processing system 1502 in accordance with an embodiment of the disclosure. As shown in FIG. 7, the FWL processing system 1502 may include a processor 1520, a memory 1522, and a display 1524. It should be appreciated that the FWL processing system 1502 may include other components that are omitted for clarity, such as a network interface, input device, etc.

The processor 1520 (as used the disclosure, the term "processor" encompasses microprocessors) may include one or more processors having the capability to receive and process well log data, such as data generating from a wireline tool or from a logging while drilling tool. In some embodiments, the processor 1520 may include an application-specific integrated circuit (AISC). In some embodiments, the processor 1520 may include a reduced instruction set (RISC) processor. Additionally, the processor 1520 may include a single-core processors and multicore processors and may include graphics processors. Multiple processors may be employed to provide for parallel or sequential execution of one or more of the techniques described in the disclosure. The processor 1520 may receive instructions and data from a memory (for example, memory 1522).

The memory 1522 (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory 1522 may be accessible by the processor 1520. The memory 1522 may store executable computer code. The executable computer code may include computer program instructions for implementing one or more techniques described in the disclosure. For example, the executable computer code may include free water level determination instructions 1526 to implement one or more embodiments of the present disclosure. In some embodiments, the FWL determination instructions 1526 may implement one or more elements of the processes 700 or 800 described above and illustrated in FIGS. 7 and 8. In some embodiments, the FWL determination instructions 1526 may receive, as input, well log data and provide, as output, free water levels (that is, the height of the free water level), graphs of the free water levels (for example, a bar graph of free water level vs each combination of facies), and other information. The outputs may be stored in the memory 1522.

The display 1524 may include a cathode ray tube (CRT) display, liquid crystal display (LCD), an organic light emitting diode (OLED) display, or other suitable display. The display 1524 may display a user interface (for example, a graphical user interface). In accordance with some embodiments, the display 1524 may be a touch screen and may include or be provided with touch sensitive elements through which a user may interact with the user interface. In some embodiments, the display 1524 may display a graph of free water levels as determined by the free water level determination instructions 1526 in accordance with the techniques described herein.

In some embodiments, the FWL processing system 1504 may include a network interface (not shown) that may provide for communication between the FWL processing system 1502 and other devices. The network interface may include a wired network interface. The network interface may communicate with networks, such as the Internet, an intranet, a wide area network (WAN), a local area network (LAN), a metropolitan area network (MAN) or other networks. Communication over networks may use suitable standards, protocols, and technologies, such as Ethernet Bluetooth, Wireless Fidelity (Wi-Fi) (for example, IEEE 802.11 standards), and other standards, protocols, and technologies.

In some embodiments, the FWL processing system 1504 may be coupled to an input device (for example, one or more input devices). The input devices may include, for example, a keyboard, a mouse, a microphone, or other input devices. In some embodiments, the input device may enable interaction with a user interface displayed on the display 1524. For example, in some embodiments, the input devices may enable the entry of inputs to a process for determining free water level and parameters used in the process (for example, parameters of a selected water saturation model used in the determination of the calculated bulk volume of oil discussed herein).

The free water level determination described herein improves the accuracy of the determined free water level, thus improving the placement of injection wells and increasing hydrocarbon production from a hydrocarbon-bearing reservoir. The improved accuracy of the free water level provides for a faster and more accurate estimation of hydrocarbon pore volumes and reserves estimation. For instance, prior to delineation, exploration wells are often drilled of top of a reservoir structure and the free water level is located via declination wells. The free water level determination described herein provides for more accurate determinations of the free water level from a crestal well using well log data and core sample data from the well, thus enabling a free water level determination before delineation.

Moreover, the free water level determination described herein is faster and more computationally efficient than previous techniques, such as the water saturation error minimization technique described above. For example, as compared to previous techniques, the free water level determination described herein may reduce the computation cost and time required to determine the free water level of a hydrocarbon-bearing reservoir.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A method for determining a free water level associated with a hydrocarbon-bearing reservoir comprising a plurality of facies, the method comprising:
    determining a reference bulk volume of oil from a well log, the reference bulk volume of oil determined from a well log porosity and a well log water saturation;
    calculating a bulk volume of oil from the well log porosity and a water saturation calculated using a capillary pressure associated with each of the plurality of facies, the calculated water saturation determined using a selected saturation height function and a facies classification for each of the plurality of facies, the facies classification determined using a facies classification scheme; and
    determining the free water level for each combination of the plurality of facies, the determining comprising a least squares minimization of the reference bulk volume of oil and the calculated bulk volume of oil for each combination of the plurality of facies.

2. The method of claim 1, comprising:
    inserting a wireline tool into the well; and
    generating the well log from measurements obtained from the wireline tool.

3. The method of claim 1, comprising:
    identifying a number of the plurality of facies according to the facies classification scheme.

4. The method of claim 1, wherein the facies classification scheme comprises Winland $r_{35}$.

5. The method of claim 1, comprising determining a combination of the plurality of facies that has a free water level having the lowest residue from the least squares minimization.

6. The method of claim 1, comprising determining a selected one of the plurality of facies that has the largest contribution to the determined free water level for each combination of the plurality of facies.

7. The method of claim 1, wherein the least squares minimization of the reference bulk volume of oil and the calculated bulk volume of oil for each combination of the plurality of facies is performed in a lexicographic order of the plurality of facies.

8. The method of claim 1, wherein the capillary pressure associated with each of the plurality of facies is determined from a core sample having a respective facie of the plurality of facies.

9. The method of claim 1, wherein the water saturation calculated using the capillary pressure associated with each of the plurality of facies is calculated using a saturation height function, the saturation height function comprising at least one of a tri-modal model, a bi-modal model, an equivalent radius model (EQR), a Thomeer model, a Brooks-Corey model, a modified Johnson model, a Lambda model, a Skelt-Harrison model, and a Levrett model.

10. A system for determining a free water level associated with a hydrocarbon-bearing reservoir comprising a plurality of facies, the system comprising:
    a processor;
    a non-transitory computer-readable memory accessible by the processor, the memory having executable code stored thereon, the executable code comprising a set of instructions that causes the processor to perform operations include
        obtaining a reference bulk volume of oil determined from a well log, the reference bulk volume of oil further determined from a well log porosity and a well log water saturation;
        calculating a bulk volume of oil from the well log porosity and a water saturation calculated using a capillary pressure associated with each of the plurality of facies, the calculated water saturation determined using a selected saturation height function and a facies classification for each of the plurality of facies, the facies classification determined using a facies classification scheme; and
        determining the free water level for each combination of the plurality of facies, the determining comprising a least squares minimization of the reference bulk volume of oil and the calculated bulk volume of oil for each combination of the plurality of facies.

11. The system of claim 10, comprising a wireline logging tool, the wireline logging tool configured to be inserted into the well and produce the well log.

12. The system of claim 10, the operations include receiving an identification of a number of the plurality of facies according to the facies classification scheme.

13. The system of claim 10, the operations include determining a combination of the plurality of facies that has a free water level having the lowest error residue from the least squares minimization.

14. The system of claim 10, the operations include determining a selected one of the plurality of facies that has the greatest contribution to the determined free water level for each combination of the plurality of facies.

15. The system of claim 10, wherein the least squares minimization of the reference bulk volume of oil and the calculated bulk volume of oil for each combination of the plurality of facies is performed in a lexicographic order of the plurality of facies.

16. The system of claim 10, wherein the capillary pressure associated with each of the plurality of facies is determined from a core sample of a respective facie of the plurality of facies.

17. The system of claim 10, wherein the water saturation calculated using the capillary pressure associated with each of the plurality of facies is calculated using a saturation height function.

18. The system of claim 10, comprising a display coupled to the processor.

19. The system of claim 18, the operations include receiving a selection of a saturation height function in a graphical user interface provided on the display.

20. The system of claim 18, the operations include outputting a bar graph on the display, the bar graph depicting the determined free water level for each combination of the plurality of facies.

21. The system of claim 18, the operations include outputting a bar graph on the display, the bar graph depicting a relative percentage of each of the plurality of facies in a well.

22. A non-transitory computer-readable medium having executable code stored thereon for determining a free water level associated with a hydrocarbon-bearing reservoir comprising a plurality of facies, the executable code comprising a set of instructions that causes a processor to perform operations comprising:

obtaining a reference bulk volume of oil determined from a well log, the reference bulk volume of oil further determined from a well log porosity and a well log water saturation;

calculating a bulk volume of oil from the well log porosity and a water saturation calculated using a capillary pressure associated with each of the plurality of facies, the calculated water saturation determined using a selected saturation height function and a facies classification for each of the plurality of facies, the facies classification determined using a facies classification scheme; and determining the free water level for each combination of the plurality of facies, the determining comprising a least squares minimization of the reference bulk volume of oil and the calculated bulk volume of oil for each combination of the plurality of facies.

* * * * *